US012791722B2

(12) United States Patent
Ferracini Alves et al.

(10) Patent No.: US 12,791,722 B2
(45) Date of Patent: Nov. 10, 2026

(54) ELECTRONIC DEVICE AND METHOD FOR ADAPTIVE TIME-OF-FLIGHT SENSING BASED ON A 3D MODEL RECONSTRUCTION

(71) Applicant: Sony Semiconductor Solutions Corporation, Atsugi (JP)

(72) Inventors: Renato Ferracini Alves, Stuttgart (DE); Valerio Cambareri, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 54 days.

(21) Appl. No.: 18/702,928

(22) PCT Filed: Oct. 19, 2022

(86) PCT No.: PCT/EP2022/079129
§ 371 (c)(1),
(2) Date: Apr. 19, 2024

(87) PCT Pub. No.: WO2023/072707
PCT Pub. Date: May 4, 2023

(65) Prior Publication Data

US 2024/0411026 A1 Dec. 12, 2024

(30) Foreign Application Priority Data

Oct. 28, 2021 (EP) .................................... 21205237

(51) Int. Cl.

| | |
|---|---|
| ***G01S 7/497*** | (2006.01) |
| ***G01S 17/36*** | (2006.01) |
| ***G01S 17/894*** | (2020.01) |

(52) U.S. Cl.
CPC ............ *G01S 17/894* (2020.01); *G01S 7/497* (2013.01); *G01S 17/36* (2013.01)

(58) Field of Classification Search
CPC ........ G01S 17/894; G01S 17/88; G01S 17/89; G01S 7/497; G01S 7/4911; G01S 7/4915; G01S 17/42; G01S 17/36
See application file for complete search history.

(56) References Cited

U.S. PATENT DOCUMENTS 9,753,128 B2 * 9/2017 Schweizer ............ G01S 7/4912
9,823,352 B2 * 11/2017 Meinherz .............. G01S 17/894
(Continued)

FOREIGN PATENT DOCUMENTS

EP 3015881 B1 8/2018
WO 2021/004216 A1 1/2021

OTHER PUBLICATIONS

International Search Report and Written Opinion mailed on Jan. 24, 2023, received for PCT Application PCT/EP2022/079129, filed on Oct. 19, 2022, 10 pages.
(Continued)

*Primary Examiner* — Vijay Shankar
(74) *Attorney, Agent, or Firm* — XSENSUS, LLP

(57) ABSTRACT

An electronic device includes circuitry that updates a camera configuration based on camera mode feedback information obtained by relating depth information obtained from Time of Flight (ToF) measurements with a reconstructed model of a scene. Moreover, a method for operating the electronic device includes updating the camera configuration based on the camera mode feedback information obtained by relating depth information obtained from the ToF measurements with the reconstructed model of a scene.

20 Claims, 16 Drawing Sheets

(56) References Cited

U.S. PATENT DOCUMENTS

| | | | | |
|---|---|---|---|---|
| 10,557,921 | B2 * | 2/2020 | Bleyer | G01S 7/4808 |
| 10,677,922 | B2 * | 6/2020 | Meinherz | G01S 17/10 |
| 10,996,335 | B2 | 5/2021 | Ortiz Egea | |
| 11,619,723 | B2 * | 4/2023 | Xu | G01S 7/4915<br>348/135 |
| 11,709,266 | B2 * | 7/2023 | Meinherz | G01S 7/497<br>356/5.01 |
| 11,875,679 | B2 * | 1/2024 | Sandbrook | G08G 1/143 |
| 2014/0206443 | A1 | 7/2014 | Sharp et al. | |
| 2016/0086336 | A1 | 3/2016 | Lin et al. | |
| 2016/0124089 | A1 * | 5/2016 | Meinherz | G01S 17/894<br>356/5.01 |
| 2019/0158813 | A1 | 5/2019 | Rowell et al. | |
| 2019/0197770 | A1 | 6/2019 | Chang et al. | |
| 2020/0301014 | A1 * | 9/2020 | Schoenlieb | G01S 17/36 |
| 2020/0348402 | A1 | 11/2020 | Ye et al. | |
| 2020/0349728 | A1 * | 11/2020 | Bitan | H04N 5/2226 |
| 2021/0063576 | A1 | 3/2021 | Gupta et al. | |
| 2021/0088636 | A1 | 3/2021 | Xu et al. | |

OTHER PUBLICATIONS

Cadena Et At., “Past, Present, and Future of Simultaneous Localization And Mapping: Towards the Robust-Perception Age,” IEEE Transactions on Robotics, vol. 32, No. 6, Dec. 2016, pp. 1309-1332.
Newcombe et al., “KinectFusion: Real-time Dense Surface Mapping and Tracking”, 2011 10th IEEE International Symposium on Mixed and Augmented Reality, Oct. 26-29, 2011, 10 pages.

* cited by examiner

| Mode A (default) | |
|---|---|
| modulation frequency | 20 MHz |
| integration time | 0.1 sec |
| duty cycle | 0.5 |
| components | 4 |
| sub-frames | 8 |
| frame rate | 25 Hz |
| read-out period | 0.2 sec |
| sub-integration cycles | 4 |
| sub-integration time | 0.2 sec |

Fig. 6a

| Mode B | |
|---|---|
| modulation frequency | 50 MHz |
| integration time | 0.1 sec |
| duty cycle | 0.5 |
| components | 4 |
| sub-frames | 8 |
| frame rate | 25 Hz |
| read-out period | 0.2 sec |
| sub-integration cycles | 4 |
| sub-integration time | 0.2 sec |

Fig. 6b

| Mode C | |
|---|---|
| modulation frequency | 60 MHz |
| integration time | 0.1 sec |
| duty cycle | 0.5 |
| components | 4 |
| sub-frames | 8 |
| frame rate | 25 Hz |
| read-out period | 0.2 sec |
| sub-integration cycles | 4 |
| sub-integration time | 0.2 sec |

Fig. 6c

ELECTRONIC DEVICE AND METHOD FOR ADAPTIVE TIME-OF-FLIGHT SENSING BASED ON A 3D MODEL RECONSTRUCTION

CROSS-REFERENCE TO RELATED APPLICATIONS

The present application is based on PCT filing PCT/EP2022/079129, filed Oct. 19, 2022, which claims priority from European Patent Application No. 21205237.7, filed Oct. 28, 2021, the entire contents of each are incorporated herein by reference.

TECHNICAL FIELD

The present disclosure generally pertains to the technical field of time-of-flight imaging, in particular to a configuration control circuitry for a time-of-flight system and a corresponding configuration control method for a time-of-flight system.

TECHNICAL BACKGROUND

Time-of-flight (ToF) cameras are typically used for determining a depth map of objects in a scene that is illuminated with modulated light. Time-of-flight systems typically include an illumination unit (e.g., including an array of light emitting diodes ("LED")) and an imaging unit including an image sensor (e.g., an array of current-assisted photonic demodulator ("CAPD") pixels or an array of single-photon avalanche diode ("SPAD") pixels) with read-out circuitry and optical parts (e.g., lenses). Still further, Time-of-flight systems typically include a processing unit (e.g., a processor) for processing the depth data generated in the ToF device.

For capturing a depth image in an iToF system, the iToF system typically illuminates the scene with, for instance, a modulated light and images the backscattered/reflected light with an optical lens portion on the image sensor, as generally known.

According to the time-of-flight principle the time that a light wave needs to travel a distance in a medium is measured. ToF systems obtain depth information of objects in a scene for every pixel of the depth image. Known are, for example, direct ToF ("dToF") systems and indirect ToF ("iToF") systems. ToF systems may further be configured as using either flood illumination with a rather homogeneous beam profile (full-field ToF), or an illumination with a certain beam profile (spot ToF, line-scan ToF, structured light, etc.).

The generated image data is output to a processing unit for image processing and depth information generation.

Typically, ToF systems operate with a predetermined configuration including different configuration parameters of the ToF system setup, including settings for the illumination unit and the imaging unit such as output power, modulation frequency, and sensor integration time.

Although there exist techniques for setting the configuration of a ToF system, it is generally desirable to improve these existing techniques.

SUMMARY

According to a first aspect the disclosure provides an electronic device comprising circuitry configured to update a camera configuration based on adaptive information obtained by relating depth information obtained from ToF measurements with a reconstructed model of a scene.

According to a further aspect the disclosure provides method comprising updating a camera configuration based on adaptive information obtained by relating depth information obtained from ToF measurements with a reconstructed model of a scene.

According to a further aspect the disclosure provides a computer program comprising instructions which when executed by a processor cause the processor to update a camera configuration based on adaptive information obtained by relating depth information obtained from ToF measurements with a reconstructed model of a scene.

Further aspects are set forth in the dependent claims, the following description and the drawings.

BRIEF DESCRIPTION OF THE DRAWINGS

Embodiments are explained by way of example with respect to the accompanying drawings, in which:

FIGS. 6*a, b* and *c* show examples of camera modes as defined in a camera controller and/or in an adaptive mode generator of the embodiments;

DETAILED DESCRIPTION OF EMBODIMENTS

Figure 1:
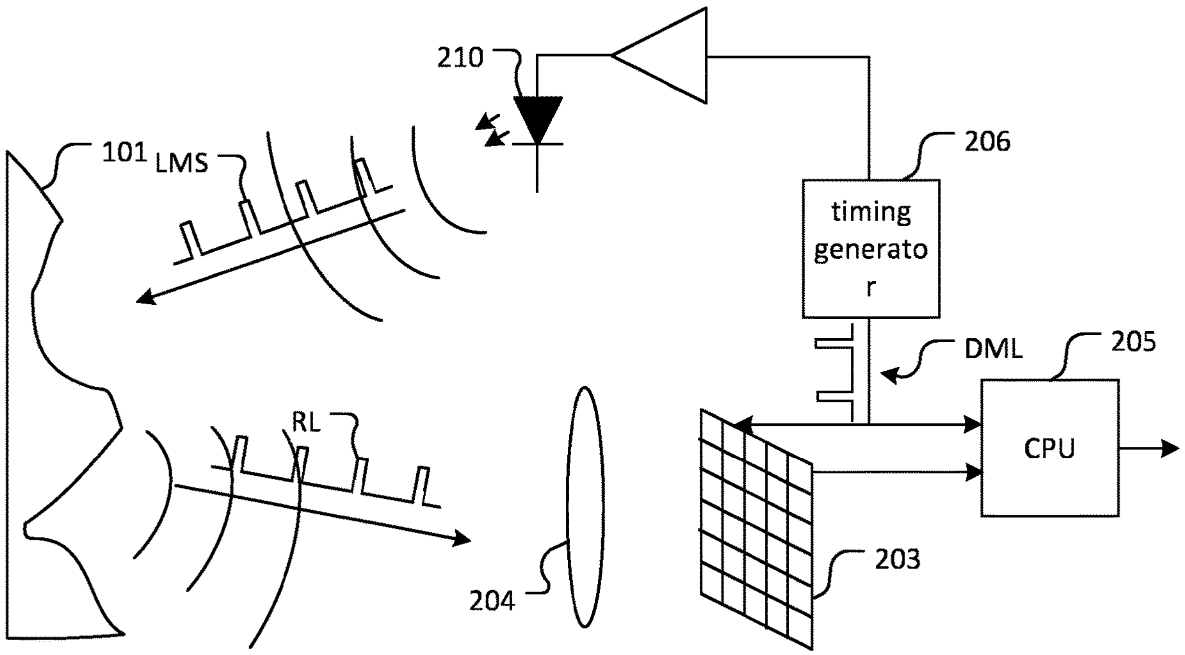
FIG. 1 schematically shows the basic operational principle of an indirect Time-of-Flight imaging system which can be used for depth sensing.

The embodiments described below in more detail provide an electronic device comprising circuitry configured to update a camera configuration based on adaptive information obtained by relating depth information obtained from ToF measurements with a reconstructed model of a scene.

The electronic device may for example be an imaging camera, in particular an iToF imaging camera, a control device for a camera, or a LiDAR or the like.

Circuitry may for example comprise a ToF imaging sensor configured to capture frames of the scene and an illumination unit configured to illuminate the scene with modulated light. Still further, the circuitry may include a processor, a memory (RAM, ROM or the like), a data storage, input means (control buttons, keys), etc. as it is generally known for electronic devices (computers, smartphones, etc.). Moreover, circuitry may include sensors for sensing light, or other environmental parameters, etc.

The model may for example be a 3D model. The model may for example be implemented as a triangle mesh grid (e.g., a local or global three-dimensional triangle mesh), a local or global voxel representation of a point cloud (uniform or octree), a local or global occupancy grid, a mathematical description of the scene in terms of planes, statistical distributions (e.g., Gaussian mixture models), or similar attributes extracted from the measured point cloud. The model is typically constructed progressively by fusing measurements from available data sources, e.g., including but not limited to depth information, color information, inertial measurement unit information, event-based camera information.

The camera configuration may be described by any configuration settings of an iToF camera's functional units such as the imaging sensor, the illumination unit, or the like.

A camera configuration may for example be defined as a camera mode comprising one or more configuration parameters.

Relating depth information obtained from ToF measurements with a reconstructed model (i.e., a running 3D reconstruction) of a scene may comprise any processing performed on raw ToF measurements, such as processing raw measurements obtained from the sensor in a ToF datapath. Relating depth information obtained from ToF measurements with a reconstructed model may also comprise transforming ToF measurements into a point cloud, registering the point cloud to the reconstructed model, and the like.

The circuitry may be configured to reconstruct and/or update the model of the scene based on the depth information obtained from ToF measurements.

The model of the scene may for example be updated based on point cloud information, and/or registered point cloud information.

The circuitry may be configured to determine an overlap between the depth information and the model of the scene, and to update the camera configuration based for example on the overlap.

Such determining an overlap between the depth information and the model of the scene relates the depth information to the reconstructed model of the scene.

Overlap may for example be any quantity that describes the overlap between the depth information and the model of the scene, e.g., a residual between the point cloud information and the model, a residual between the depth information and a projected depth view of the model, a residual between the color information and a projected color view of the model, or the like.

The circuitry may be configured to decide, based on the overlap, whether or not the camera configuration is to be updated.

The circuitry is configured to improve, for example, the signal-to-noise ratio by updating the camera configuration. The SNR may be defined as the phasor amplitude divided by the phasor standard deviation.

The camera configuration comprises one or more of a modulation frequency of an illumination unit of a ToF camera, an integration time, a duty cycle, a number samples per correlation waveform period, a number of sub-frames per measurement, a frame rate, a length of a read-out period (which may also be fixed by the sensor), a number of sub-integration cycles and a time span of the sub-integration cycles.

The camera mode feedback information controlling the camera configuration comprises an effective range of the scene.

The camera mode feedback information controlling the camera configuration comprises a saturation value of a ToF signal amplitude.

The circuitry may be configured to determine unwrapping feedback based on the model ($S_{k-1}$) of the scene.

The circuitry may be configured to determine unwrapping feedback for a pixel based on the model of the scene, and an estimated camera pose.

The circuitry may be configured to determine a wrapping index for a pixel based on the unwrapping feedback for the pixel.

The circuitry may be configured to determine model feedback based on an overlap between the depth information from ToF measurements and the model of the scene.

The circuitry may be configured to update parts of the model of the scene.

The circuitry may be configured to estimate a camera pose and to determine an overlap between the model of the scene and a current frame viewed from the estimated pose of the camera corresponding to the current frame.

The embodiments also describe a method comprising updating a camera configuration based on camera mode feedback information obtained by relating depth information obtained from ToF measurements with a reconstructed model of a scene.

The embodiments also describe a computer program comprising instructions which when executed by a processor cause the processor to update a camera configuration based on camera mode feedback information obtained by relating depth information obtained from ToF measurements with a reconstructed model of a scene.

The computer program may be implemented on a computer-readable medium storing the instructions.

Operational Principle and Datapath of an Indirect Time-of-Flight Imaging System (iToF)

FIG. 1 schematically shows the basic operational principle of an indirect Time-of-Flight imaging system which can be used for depth sensing. The iToF imaging system includes an iToF camera with an imaging sensor 203 having a matrix of pixels and a processor (CPU) 205. A scene 101 is actively illuminated with amplitude-modulated infrared light LMS at a predetermined wavelength using an illumination device 210, for instance with some light pulses of at least one predetermined modulation frequency DML generated by a timing generator 206. The amplitude-modulated infrared light LMS is reflected from objects within the scene 201. A lens 204 collects the reflected light 209 and forms an image of the scene 101 onto the imaging sensor 103. In indirect Time-of-Flight (iToF) the CPU 205 receives the ToF measurements and determines for each pixel a phase delay between the modulated signal DML and the reflected light RL and a depth value for each pixel as described below.

Consider an iToF camera pixel imaging an object at a distance D. A (differential) iToF pixel measurement $\nu(\tau_E, \tau_D)$ as obtained in the iToF pixel is a variable whose expected value $\mu(\tau_E, \tau_D)$ is given by $$\mu(\tau_E, \tau_D) = E(\nu(\tau_E, \tau_D)) = \int_0^{T_I} m(t)\phi_R(t, \tau_E, \tau_D)dt \quad \text{(Eq. 1)}$$

where, t is the time variable, $T_I$ is the exposure time (integration time), m(t) is the in-pixel reference signal which corresponds to the modulation signal (i.e. the emitted light signal) or a phase shifted version of the modulation signal. $\Phi_R(t, \tau_E, \tau_D)$ is the pixel irradiance signal which represents the reflected light (RL in FIG. 2) captured by the pixel. $\tau_E$ represents a time variable indicative of the time delay between the in-pixel reference signal (modulation signal) and the emitted light (in FIG. 2), and $\tau_D$ is a time variable representing the time that it is required for the light to travel from the iToF camera to the object (201 in FIG. 2) and back. Neglecting the parallax effect, the time variable $\tau_D$ is given by:

$$\tau_D = \frac{2D}{c} \quad \text{(Eq. 2)}$$

where D is the distance between the ToF camera and the object, and c is the speed of light.

The reflected light signal $\Phi_R(t, \tau_E, \tau_D)$ is a scaled and delayed version of the emitted light $\Phi_E(t-\tau_E)$. The pixel irradiance signal $\Phi_R(t, \tau_E, \tau_D)$ is given by:

$$\Phi_R(t, \tau_E, \tau_D) = \Phi(\tau_D) \times \Phi_E(t - \tau_E - \tau_D) \quad \text{(Eq. 3)}$$

where $\Phi(\tau_D)$ is a real value scaling factor that depends on the distance D between the ToF camera and the object, and $\Phi_E(t-\tau_E-\tau_D)$ is the emitted light $\Phi_E(t-\tau_E)$ (16 in FIG. 1) additionally delayed with the time variable $\tau_D$.

In the context of iToF, both m(t) and $\phi_E(t)$ are typically periodical signals with period $$T_M = f_{mod}^{-1}$$

Figure 2:
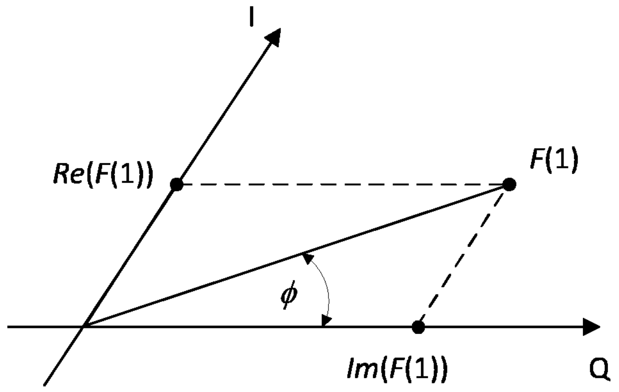
FIG. 2 shows in a schematic way the determination of the phase value between the emitted and the received light from the IQ measurement.

($f_{mod}$ being the fundamental frequency or modulation frequency generated by the timing generator (106 in FIG. 2).

As $T_I \gg T_M$, the expected differential signal $\mu(\tau_E, \tau_D)$ is also a periodical function with respect to the electronic delay $\tau_E$ between in-pixel reference signal m(t) and optical emission $\Phi_E(t-\tau_E)$ with the same fundamental frequency $f_{mod}$.

Writing $\mu(\tau_E, \tau_D)$ in terms of its Fourier Coefficients $M_k$ yields $$\mu(\tau_E, \tau_D) = \Phi(\tau_D)\sum_{k=-\infty}^{\infty}\left(M_k e^{j2\pi k f_{mod}\tau_D}\right)e^{j2\pi k f_{mod}\tau_E} \quad \text{(Eq. 4)}$$

Note that due to the distance-dependent scaling of the light (factor $\Phi(\tau_D)$), the expected differential signal $\mu(\tau_E, \tau_D)$ is not periodical with respect to the time-of-flight $\tau_D$.

From the above it is clear that the time-of-flight, and hence depth, can be estimated from the first harmonic $H_1(\tau_D)$ Of $\mu(\tau_E, \tau_D)$:

$$H_{1,\mu}(\tau_D) = \int \mu(\tau_E, \tau_D)e^{-j2\pi f_{mod}\tau_E}d\tau_E \propto \Phi(\tau_D)M_1 e^{j2\pi f_{mod}\tau_D} \quad \text{(Eq. 5)}$$

From the first harmonic $H_{1,\mu}(\tau_D)$ the phase angle $\theta_{1,\mu}(\tau_D)$ is obtained as $$\theta_{1,\mu}(\tau_D) = \angle H_{1,\mu}(\tau_D) = 2\pi f_{mod}\tau_D + \psi_{M_1} \quad \text{(Eq. 6)}$$

with $$\psi_{M_1} = \angle H_1 \quad \text{(Eq. 7)}$$

Here, $\angle$ denotes the phase of a complex number $z=re^{i\phi}$ $$\angle z = \angle\left(re^{i\phi}\right) = \phi \quad \text{(Eq. 8)}$$

In practice, it is not feasible to evaluate $H_{1,\mu}(\tau_D)$ due to the presence of noise and due to the number of transmit delays.

Concerning the presence of noise, $H_{1,\mu}(\tau_D)$ is formulated in terms of the expected value $\mu(\tau_E, \tau_D)$ of differential mode measurements $\nu(\tau_E, \tau_D)$. Estimating this expected value from measurements may be performed by multiple repeated acquisitions (of static scene) to average out noise.

Concerning the number of transmit delays, $H_{1,\mu}(\tau_D)$ is given as an integral over all possible transmit delays $\tau_E$. Approximating this integral may require a high number of transmit delays.

Due to these reasons iToF systems measure an approximation of this first harmonic $H_{1,\mu}(\tau_D)$. This approximation uses N differential mode measurements (i.e. N different measurements collected at the N taps) $\nu(\tau_{E,n}, \tau_D)$ (n=0, . . . , N−1) corresponding to N electronic transmit delays $\tau_{E,n}$. A vectorized representation of this set of transmit delays is:

$$t_E = [\tau_{E,0} \ \dots \ \tau_{E,N-1}]^T \quad \text{(Eq. 9)}$$

The approximation of the first harmonic $H_{1,\mu}(\tau_D)$ is obtained by an N-point EDFT (Extended Discrete Fourier Transform), according to $$H_{1,\nu}(\tau_D; t_E) = \sum_{k=0}^{N-1}\nu(T_{E,n}, \tau_D)e^{-j2\pi\frac{nk}{N}} \quad \text{(Eq. 10)}$$

with n being the N-point EDFT bin considered. In standard iToF, n=1. However, depending on the transmit delays selected, different values of n could be more appropriate. For simplicity and without loss of generality, we will assume n=1 in the remainder of this disclosure:

$$H_{1,\nu}(\tau_D; t_E) = \sum_{k=0}^{N-1}\nu(\tau_{E,n}, \tau_D)e^{-j2\pi\frac{k}{N}} \quad \text{(Eq. 11)}$$

This first harmonic estimate $H_{1,\nu}(\tau_D; t_E)$ is also referred to as IQ measurement (with I and Q the real resp. imaginary part of the first harmonic estimate). In order to stay close to iToF nomenclature, in the following $H_{1,\nu}(\tau_D; t_E)$ is denoted as "IQ measurement". However, it is important to remember that an IQ measurement is an estimate of the first harmonic $H_{1,\mu}(\tau_D)$ of the expected differential measurement (as function of transmit delay).

From the first harmonic estimate $H_{1,\nu}(\tau_D; t_E)$ of equation Eq. 11, the phase value $\phi$ between the emitted and the received light is obtained as $$\phi = \text{atan2}\left(\frac{\text{Im}(H_{1,\nu}(\tau_D; t_E))}{\text{Re}(H_{1,\nu}(\tau_D; t_E))}\right) \quad \text{(Eq. 12)}$$

with Im( ) and Re( ) being respectively the imaginary part and the real part operator, and arctan 2 being the 4-quadrant inverse tangent function.

Due to the statistical nature of the differential mode measurements $\nu(\tau_{E,n}, \tau_D)$, the IQ measurement $H_{1,\nu}(\tau_D; t_E)$ is a random variable with the following expected value $$E(H_{1,\nu}(\tau_D; t_E)) \equiv H_{1,\mu}(\tau_D; t_E) = \sum_{k=0}^{N-1} \mu(\tau_{E,n}, \tau_D) e^{-j2\pi\frac{k}{N}} \quad \text{(Eq. 13)}$$

This expected value is here referred to as expected IQ measurement.

With $$F(1) = E(H_{1,\nu}(\tau_D; t_E)) \quad \text{(Eq. 14)}$$

denoting the IQ measurement, and $$q_n = \mu(\tau_{E,n}, \tau_D) \quad \text{(Eq. 15)}$$

denoting the N measurements (samples) obtained by the pixel at respective phases, this gives:

$$F(1) = \sum_{k=0}^{N-1} q_n e^{-j2\pi\frac{k}{N}} \quad \text{(Eq. 16)}$$

Specifically, once the Fourier transform is computed on the samples of the correlation waveform, the first harmonic will contain I and Q information as its real and imaginary part, respectively.

Based on equation Eq. 12 the phase value $\phi$ between the emitted and the received light is obtained as:

$$\phi = \text{arctan2}\left(\frac{\text{Im}(F(1))}{\text{Re}(F(1))}\right). \quad \text{(Eq. 17)}$$

FIG. 2 shows in a schematic way the determination of the phase value $\phi$ between the emitted and the received light from the IQ measurement F(1) as set out in Eq. 17. The imaginary part Im(F(1)) of the IQ measurement F(1) denotes the Q component of the IQ measurement F(1). The real part Re(F(1)) of the IQ measurement F(1) denotes the I component of the IQ measurement F(1). The phase value $\phi$ is obtained from the Q component and I component of the IQ measurement F(1) according to trigonometric principles.

Figure 3:
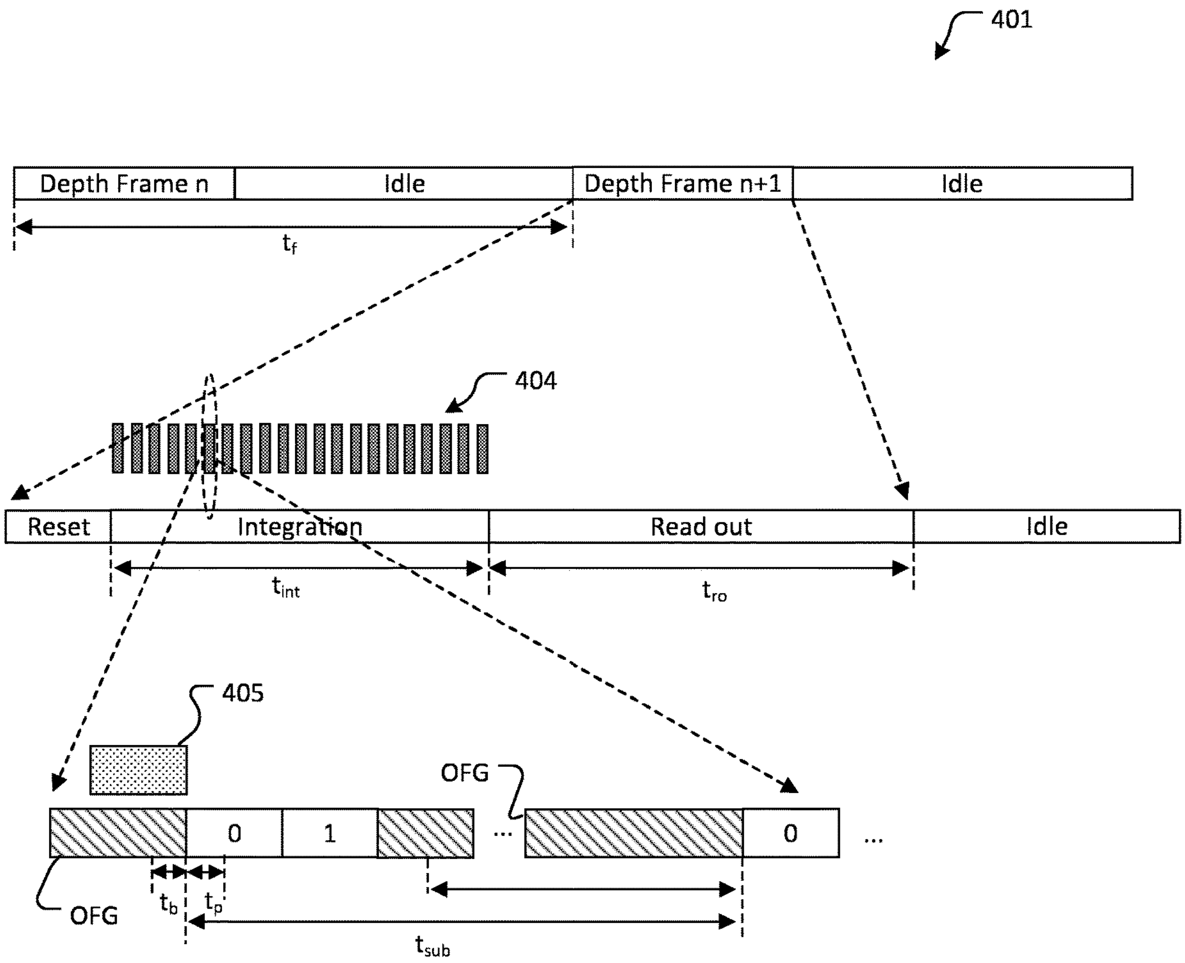
FIG. 3 shows an embodiment of a frame structure of a 2-tap iToF pixel.

FIG. 3 shows an example of a frame structure of a ToF camera with 2-tap pixels. The exemplary signal 401 provided by the read-out circuitry of the camera comprises an alternating structure of depth frames (depth frames k, k+1, . . . ) and idle periods at a frame rate of 30 frames per second ($t_f$=33.3 ms). A depth frame (here for example depth frame k+1) comprises a reset period, followed by an integration period, again followed by a read-out period. During the integration period a sequence 404 of light pulses are emitted by the illumination unit of the iToF imaging system. The illumination period may for example last 400 μs and may comprise 800 pulses of 5 ns, which yields a duty cycle of 1%. The read-out period may last 5.3 ms and the read-out may be performed MIPI standard compliant. Each pulse 405 of the sequence 404 of light pulses defines a sub-integration cycle. Within a sub-integration cycle the first and second transfer gates, which correspond to taps 0 and 1, are active one after the other followed by an activation of an overflow gate OFG which is opened after the second tap has been closed. One sub-integration cycle is defined as lasting from the beginning of the activation of a first transfer gate TG1, corresponding to tap 0 (a second transfer gate TG2, corresponding to tap 1), until the deactivation of the overflow gate OFG. The sub-integration cycle has a time span $t_{sub}$ which may be $t_{sub}$=500 ns, which equals the period of one emitted light pulse (although the pulse width is only 1% of the pulse period). The activation pulse width $t_p$ of the transfer gates may be equal and may for example be $t_p$=15 ns. The pulse width of the emitted light may be equal or smaller than the activation pulse width $t_p$ of the transfer gates. The transfer gates may be activated directly each of the other, which yields a combined activation time of as $t_{max}$=30 ns per sub-integration cycle. The overflow gate may be activated the remaining time of the sub-integration cycle which may be 470 ns. The combined activation time $t_{max}$ of all transfer gates and corresponding taps defines the (radial unambiguous) range (see also FIG. 5) in which the iToF camera can record objects unambiguously. The emitted light pulse 405 may have a time delay $t_b$(phase shift) with respect to the activation of the first transfer gate, corresponding to tap 0. The time delay $t_b$ may for example be $t_b$=ins.

In another embodiment the above described technique may also be applied to N-Tap pixel (N being a natural number greater than 2), or to continuous wave time of flight imaging.

Wrapping Problem

When determining the distance D corresponding to a phase delay value $\phi$ of a pixel, a so-called "wrapping problem" may occur. As explained above, the distance is a function of the phase difference between the emitted and received modulated signal. This is a periodical function with period 2π. Different distances will produce the same phase measurement. This is called the wrapping problem. A phase measurement produced by the iToF camera is "wrapped" into a fixed interval, i.e., [0,2π], such that all phase values corresponding to a set $\{\Phi | \Phi = 2i\pi + \varphi, l \in Z\}$ become $\varphi$, where i is called "wrapping index". In terms of depth measurement, all depths are wrapped into an interval that is defined by the modulation frequency. In other words, the modulation frequency sets the unambiguous operating range $Z_{Unambiguous}$ as described by:

$$Z_{Unambiguous} = \frac{c}{2 \cdot f_{mod}} \quad \text{(Eq. 19)}$$

with c being the speed of light, and $f_{mod}$ the modulation frequency. For example, for an iToF camera having a modulation frequency 20 MHz, the unambiguous range is 7.5 m.

Figure 4:
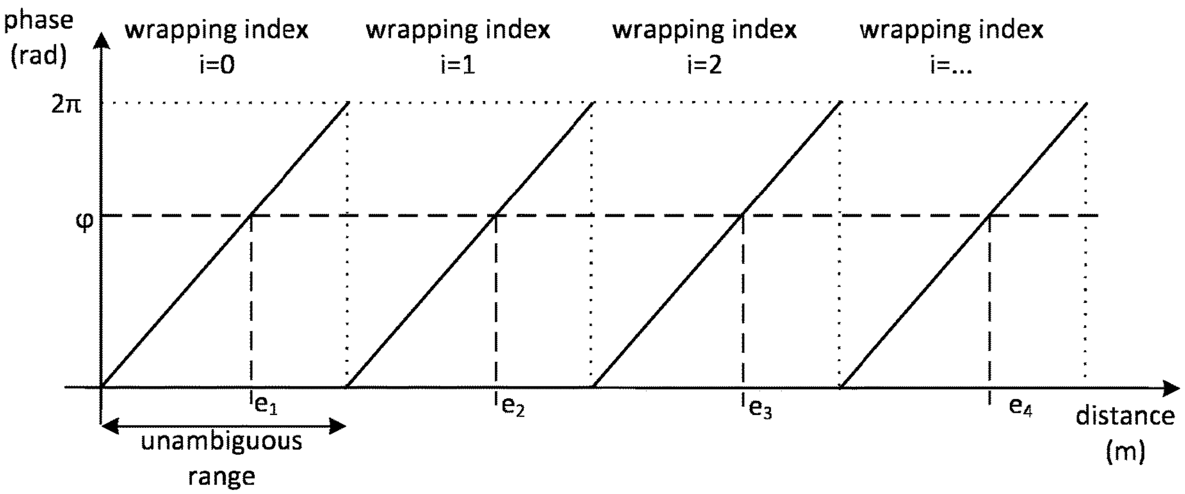
FIG. 4 schematically illustrates in diagram the wrapping problem of iToF phase measurements.

FIG. 4 schematically illustrates in a diagram this wrapping problem of iToF phase measurements. The abscissa of the diagram represents the distance (true depth or unambiguous distance) between an iToF pixel and an object in the scene, and the ordinate represents the respective phase measurements obtained for the distances. The horizontal spotted line represents the maximum value of the phase measurement, 2π, and the horizontal dashed line represents an exemplary phase measurement value φ. The vertical dashed lines represent different distances $e_1$, $e_2$, $e_3$, $e_4$ that correspond to the exemplary phase measurement φ due to the wrapping problem. Thereby, any one of the distances $e_1$, $e_2$, $e_3$, $e_4$ corresponds to the same value of φ. The distance $e_1$ can be attributed to a wrapping index i=0, the distance $e_2$ can be attributed to a wrapping index i=1, the distance $e_3$ can be attributed to a wrapping index i=2, and so on. The unambiguous range defined by the modulation frequency is indicated in FIG. 4 by a double arrow and is 2π.

The wrapping problem may be solved for example based on single-, dual-, or multi-frequency phase measurements. Additionally, or instead, the wrapping problem may be solved based on the smoothness of prior probabilities for neighboring pixels (i.e. close pixels will likely have the same wrapping index). Additionally, or instead the wrapping problem may be solved based on an unwrapping feedback, in the form of prior probabilities (i.e. a priori information on which are the most likely wrapping indexes) from a reconstructed model, for example based on a model overlap decision as described below with regard to FIG. 11 in more detail.

Multi-frequency iToF uses multiple frequencies to solve the wrapping problem and improve the quality and range of the depth information. The iToF camera repeats the depth measurements at more than one frequency and thereby extends the unambiguous range based on a multi-frequency phase unwrapping algorithm, which may be based on the Chinese Remainder Theorem. For example, for a fixed integration time and to achieve an effective unambiguous range of 15 m for a mobile rear-facing use-case, a pair of frequencies 40 MHz, 50 MHz, to resolve the effective frequency of 10 MHz=GreatestCommonDivisor(40 MHz, 50 MHz). In this case, phase unwrapping will be needed to fuse the dual- (or multi-) frequency measurements, wherein in case the camera moves during the acquisition motion artefacts will appear in the form of inconsistent depth values. For multi-frequency measurements the unwrapping algorithm is inherently part of the ToF datapath (the datapath may or may not include additional pipeline blocks to track illumination patterns, to fuse different exposures, or to fuse different modalities at low-level to obtain a depth estimate). Therefore, the effective modulation frequency is lowered by phase unwrapping and if a minimum SNR requirement is met better precision performances per-frequency are achieved.

In iToF cameras the signal-to-noise ratio $SNR_{Signal}$ affects the measurements' precision, that is the noise of the depth measurement $N_{depth,RMS}$, and for high $SNR_{Signal}$ (for example approximately bigger than 5) they assume a linear relation:

$$N_{depth,RMS} \propto \frac{1}{f_{mod}} \cdot \frac{1}{SNR_{signal}} \quad \text{(Eq. 20)}$$

Further, any ground truth depth $D_{GT}$ in the observed scene satisfies in modulation frequency and corresponding unambiguous range $Z_{Unambiguous}$, the equation $$D = (D_{GT} + \text{Measurement Bias} + \text{Measurement Noise}) \bmod Z_{Unambiguous}, \quad \text{(Eq. 21)}$$

wherein bias refers to a systematic error, that does not vanish if infinite frames of the same scene are averaged and noise refers to a part of the signal, that vanishes if infinite frames of the same scene are averaged.

Several methods exist to increase the $SNR_{Signal}$ and therefore reduce noise of the depth measurement $N_{depth,RMS}$, like focusing light at specific locations rather than using full-field, uniform illumination (also referred to as spot ToF using vertical-cavity surface emitting laser with diffractive optical elements) or using multi-frequency methods.

The SNR in the field of iToF refers to the ratio between the mean signal amplitude and phasor noise standard deviation. Further, the signal-to-noise ratio $SNR_{Signal}$ can be improved by a higher modulation frequency or by a shorter integration time.

In another embodiment the precision P, which is the relative standard deviation in percent i.e.

$$P = \frac{100\sigma_D}{\mu_D},$$

[P]=%, may be improved (P is only relating to the final depth value statistics).

In the following it is described an approach to minimize the noise of the depth measurement $N_{depth,RMS}$ by changing and optimizing adaptively a iToF camera configuration mode in accordance with dynamic feedback information acquired based on a reconstructed 3D model of the imaged scene. The camera configuration mode may be stored as preset profiles (also referred to as presets) which are set off-line. The presets may contain sensor calibration data and may define specific values for integration times and modulation frequencies according to a specific use-case requirement such as maximum unambiguous range or typical object reflectivity (e.g., for front-facing or rear-facing mobile devices).

Adaptive iToF Camera System Configuration

Figure 5:
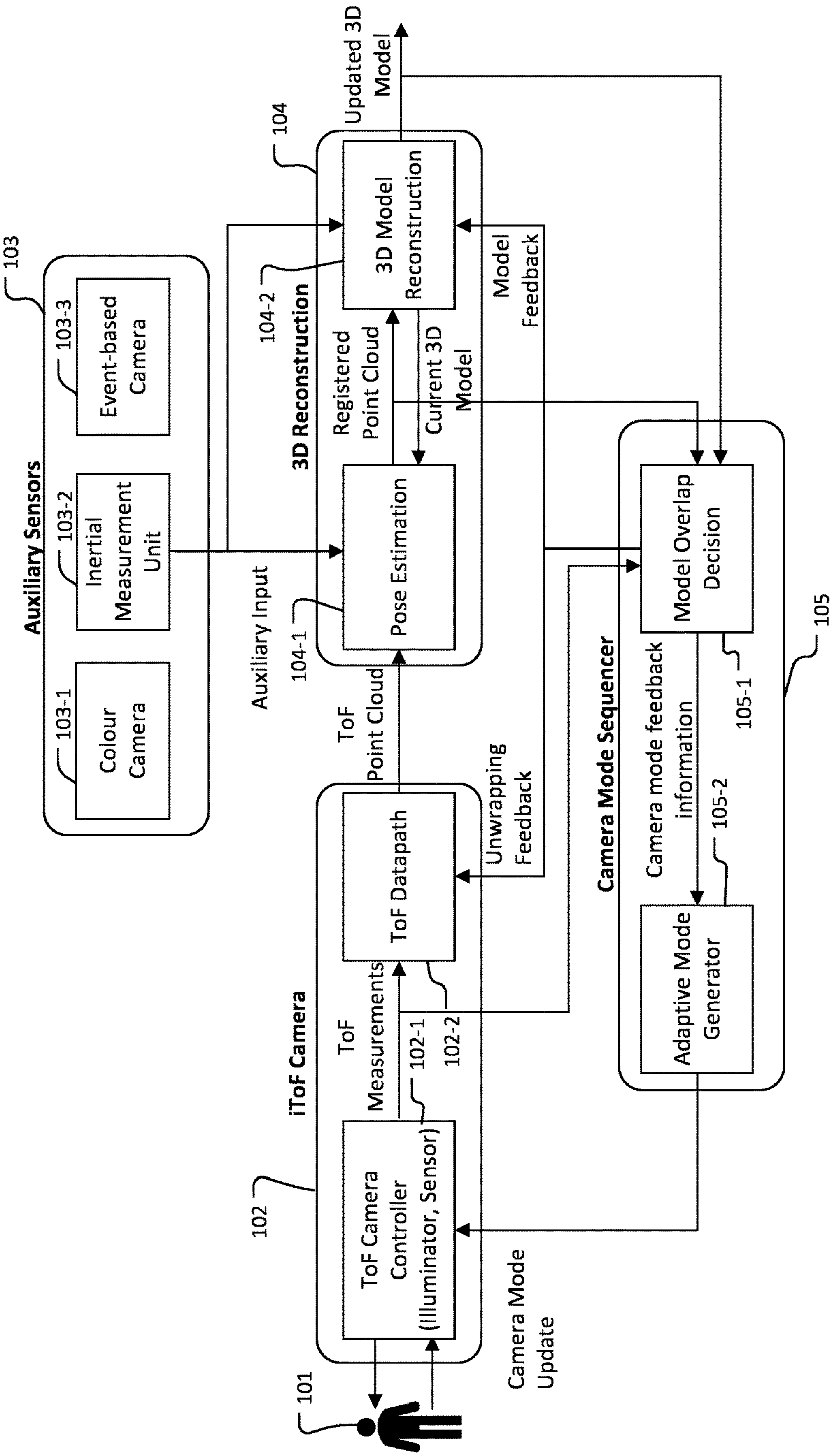
FIG. 5 schematically shows an iToF system with a camera mode sequencer.

FIG. 5 schematically shows an iToF system with a camera mode sequencer.

A scene 101 is illuminated by an iToF camera 102 (see also FIG. 1) and the reflected light from the scene 101 is captured by the iToF camera 102. The iToF camera 102 comprises an iToF camera controller 102-1 which controls the operation of the illuminator and the sensor of the camera according to configurations modes which define configuration settings related to the operation of the imaging sensor and the illumination sensor (such as exposure time, or the like). The controller 102-1 provides the ToF measurements (e.g. depth data frames) to a ToF datapath 102-2 which processes the ToF measurements into a ToF point cloud (defined e.g. in a 3D camera coordinate system). The ToF point cloud is a point representation of the ToF measurements which describes the current scene as viewed by the ToF camera. The ToF point cloud may for example be represented in a cartesian coordinate system of the iToF camera. This ToF point cloud obtained from the ToF datapath is forwarded to a 3D reconstruction 104.

3D reconstruction 104 creates and maintains a three-dimensional (3D) model of the scene 101 based on technologies known to the skilled person, for example based on the “KinectFusion” pipeline described in more detail with regard to FIGS. 6 and 7 below. In particular, 3D reconstruction 104 comprises a pose estimation 104-1 which receives the ToF point cloud. The pose estimation 104-1 further receives auxiliary input from auxiliary sensors 103, and a current 3D model from a 3D model reconstruction 104-2. Based on the ToF point cloud, the auxiliary input, and the current 3D model, the pose estimation 104-1 applies algorithms to the measurements to determine the pose of the ToF camera (defined by e.g. position and orientation) in a global scene (“world”). Such algorithms may include for example be the iterative closest point (ICP) method between point cloud information and the current 3D model, or for example a SLAM (Simultaneous localization and mapping) pipeline. Knowing the camera pose, the pose estimation 104-1 “registers” the ToF point cloud obtained from datapath 102-2 to the global scene, thus producing a registered point cloud which represents the point cloud in the camera coordinate system as transformed into a global coordinate system (e.g. a “world” coordinate system) in which a model of the scene is defined.

The registered point cloud obtained by the pose estimation 104-1 is forwarded to a 3D model reconstruction 104-2. The 3D model reconstruction 104-2 updates a 3D model of the scene based on the registered point cloud obtained from the pose estimation 104-1 and based on auxiliary input obtained from the auxiliary sensors 103. This process of updating the 3D model is described in more detail with regard to FIGS. 6, 7 below.

The updated 3D model of the scene 101 is stored in a 3D model memory and forwarded to a model overlap decision 105-1 of a camera mode sequencer 105 (in another embodiment there may no 3D model memory and the updated 3D model is forwarded directly). The model overlap decision 105-1 decides if there is overlap between the registered point cloud and the updated 3D model and produces camera mode feedback information based on this decision (and optionally other information obtained from the ToF measurements) and forwards this camera mode feedback information to the adaptive mode generator 105-2 as camera mode feedback information. For example, the model overlap decision 105-1 may decide if the model overlap between the current registered point cloud and the updated 3D model exceeds a predetermined overlap threshold as described in more detail with regard to FIGS. 9 and 10 below. For example, the model overlap decision 105-1 may decide if the model overlap between the current color image and the projected 3D model (i.e. in terms of photometric residual) is smaller than an arbitrary threshold. For example, the model overlap decision 105-1 may also decide based on attributes of the estimated pose and trajectory, such as velocity, acceleration, or the like.

Further, based on the registered point cloud and the updated 3D model, the model overlap decision 105-1 yields unwrapping feedback, for example in the form of an unwrapping index probability map that is delivered to the ToF datapath 102-2 to improve the disambiguation of the ToF measurements (see FIG. 11) as processed by the datapath 102-2.

Still further, based on the registered point cloud and the 3D model, the model overlap decision 105-1 determines model feedback that is delivered to the 3D model reconstruction 104-2. The model feedback may for example be in the form of an overlap information between registered point cloud and 3D model, or an error probability map that can be used to invalidate or keep in a separate buffer the unreliable registered point cloud information for further processing.

Based on the camera mode feedback information determined by the model decision 105-1, the adaptive mode generation 105-2 determines a camera mode update. The determined camera mode update is delivered to the ToF camera control 102-1 where these camera configurations of the imaging sensor and the illuminator are updated accordingly. For example, the model decision 105-1 adapts the camera configuration mode for each frame.

As described above, the pose estimation 104-1 and the 3D model reconstruction 104-2 obtain auxiliary input from auxiliary sensors 103. The auxiliary sensors 103 comprise a colour camera 103-1 which provides e.g. an RGB/LAB/YUV image of the scene 101, from which sparse or dense visual features can be extracted to perform conventional visual odometry, that is determining the position and orientation of the current camera pose. The auxiliary sensors 103 further comprises an event-based camera 103-2 providing e.g. high frame rate cues for visual odometry from events. The auxiliary sensors 103 further comprise an inertial measurement unit (IMU) 103-3 which provides e.g. acceleration and orientation information, that can be suitably integrated to provide pose estimates. These auxiliary sensors 103 gather information about the scene 101 in order to aid the 3D reconstruction 104 in producing and updating a 3D model of the scene.

Camera Modes

Camera modes comprise configuration settings of an iToF camera's functional units such as the imaging sensor, and the illumination unit. The camera configuration modes as described here may for example be stored as preset profiles (also referred to as presets) in the camera controller and/or in the adaptive mode generator. A camera mode may define specific configuration parameters of e.g. the imaging sensor, and the illumination unit.

In the following, three exemplary camera modes are described for a multi-frequency camera that allows for three different modulation frequencies, namely 20 MHz, 50 MHz, and 60 MHz.

FIG. 6*a* shows an example of a camera mode as defined in e.g. the camera controller (102-1 in FIG. 5) and/or in the adaptive mode generator (105-2 in FIG. 5) of the embodiments. The exemplary default camera mode, which is named as “mode A”, is foreseen as a default camera mode of the ToF camera. This exemplary default camera mode A defines a modulation frequency of 20 MHz, an integration time of 0.1 seconds, a duty cycle of 50%, a number of four samples per correlation waveform period (number of components), a number of eight sub-frames per measurement, a frame rate of 25 Hz, a length of a read-out period of 0.2 seconds, a number of four sub-integration cycles and time span $t_{sub}$=0.2 seconds of the sub-integration cycles.

FIG. 6*b* shows an example of an alternative camera mode, called camera mode B. The exemplary default camera mode A defines a modulation frequency of 50 MHz, an integration time of 0.1 seconds, a duty cycle of 50%, a number of four samples per correlation waveform period (number of components), a number of eight sub-frames per measurement, a frame rate of 25 Hz, a length of a read-out period of 0.2 seconds, a number of four sub-integration cycles and time span $t_{sub}$=0.2 seconds of the sub-integration cycles.

Accordingly, a camera mode update from the default camera mode A to camera mode B will change the modulation frequency of the imaging sensor from 20 to 50 MHz.

FIG. 6*c* shows another example of an alternative camera mode, called camera mode C. The exemplary default camera mode A defines a modulation frequency of 60 MHz, an integration time of 0.1 seconds, a duty cycle of 50%, a number of four samples per correlation waveform period (number of components), a number of eight sub-frames per measurement, a frame rate of 25 Hz, a length of a read-out period of 0.2 seconds, a number of four sub-integration cycles and time span $t_{sub}$=0.2 seconds of the sub-integration cycles.

Accordingly, a camera mode update from the default camera mode A to camera mode C will change the modulation frequency of the imaging sensor from 20 to 60 MHz.

In addition or alternatively (not shown in FIGS. 6*a, b* and *c*), a camera mode may be defined by configuration parameters such as an activation pulse width $t_p$ of a transfer gate, a pulse width of the emitted light, a combined activation time per sub-integration cycle etc (see FIG. 4).

Still further, a camera configuration mode may define illumination spatial attributes such as field of illumination and illumination pattern (for example spot illumination patterns, which allow a maximization of the signal-to-noise ratio at specific coordinates).

The ToF camera configuration may for example include four-components single-frequency measurements, eight-components single-frequency measurements, eight-components dual-frequency measurements (two sub-frames) or the like (see below).

Any of these parameters may be changed to increase the precision of the 3D model of the scene.

The configuration parameters defined in the camera modes may for example be chosen according to specific use-case requirements such as maximum unambiguous range or typical object reflectivity (e.g., for front-facing or rear-facing mobile devices).

ToF Datapath

A ToF datapath (102-2 in FIG. 5) is configured to receive camera raw data (ToF measurements) and to process this raw data further, e.g. into a ToF point cloud (defined e.g. in a 3D camera coordinate system).

The ToF datapath may also perform processing such as transforming a depth frame into a vertex map and normal vectors (see 701 in FIG. 7 below).

The ToF datapath may also comprise a sensor calibration block, which, by calibration, removes the phases, sources of systematic error such as temperature drift, cyclic error due to spectral aliasing on the return signal, and any error due to electrical non-uniformity of the pixel array. Based on the phase value $\phi$ obtained from the measurements $q_0, \ldots, q_N$ at a pixel according to equation Eq. 17 the corresponding depth value d for the pixel is determined as follows:

$$D = \frac{c}{4\pi f_{mod}}\phi \quad \text{(Eq. 18)}$$

with $f_{mod}$ being the modulation frequency of the emitted signal and c being the speed of light.

For each frame k, from the depth measurement $D_k$ for each pixel a three-dimensional coordinate within the camera coordinate system is determined, which yields a ToF point cloud for the current frame k. Further, the ToF datapath 102-2 may comprise filters that improve the signal quality and mitigate errors on the point cloud, such as ToF data denoising, removal of pixels incompatible with the viewpoint (e.g., "flying" pixels between foreground and background), removal of multipath effects such as scene, lens, or sensor scattering.

3D Reconstruction 3D reconstruction 104 of FIG. 5 receives ToF point clouds and produces a 3D model of the scene 101 while simultaneously tracking the ToF camera's motion (i.e. the ToF's camera current pose). This problem is also known to the skilled person as "Simultaneous localization and mapping". Several methods exist to solve this for example Extended Kalman Filter Based SLAM, Parallel Tracking and Mapping or the like. An overview of different SLAM methods is for example given in the paper C. Cadena et al., "Past, Present, and Future of Simultaneous Localization And Mapping: Towards the Robust-Perception Age," IEEE Transactions on Robotics, vol. 32, no. 6, pp. 1309-1332, 2016.

Auxiliary sensor data (e.g. from the auxiliary sensors 103 of FIG. 4) may optionally be used at several stages to improve the 3D model reconstruction. The main use may be the providing of additional data streams that can be used to refine or optimize the quality of the pose estimation (104-1 in FIG. 5), by fusing diverse cues and complementary features in the sensor data. For example, the extraction of sparse features from RGB frames may be used to perform visual odometry by finding feature correspondences in consecutive frames. Therefore, sensor data may be used jointly to estimate a single pose in the pose estimation (for example an ICP method or a SLAM pipeline). The auxiliary sensor unit and the iToF system may operate in sensor fusion camera kits for a specified target use-case.

Figure 7:
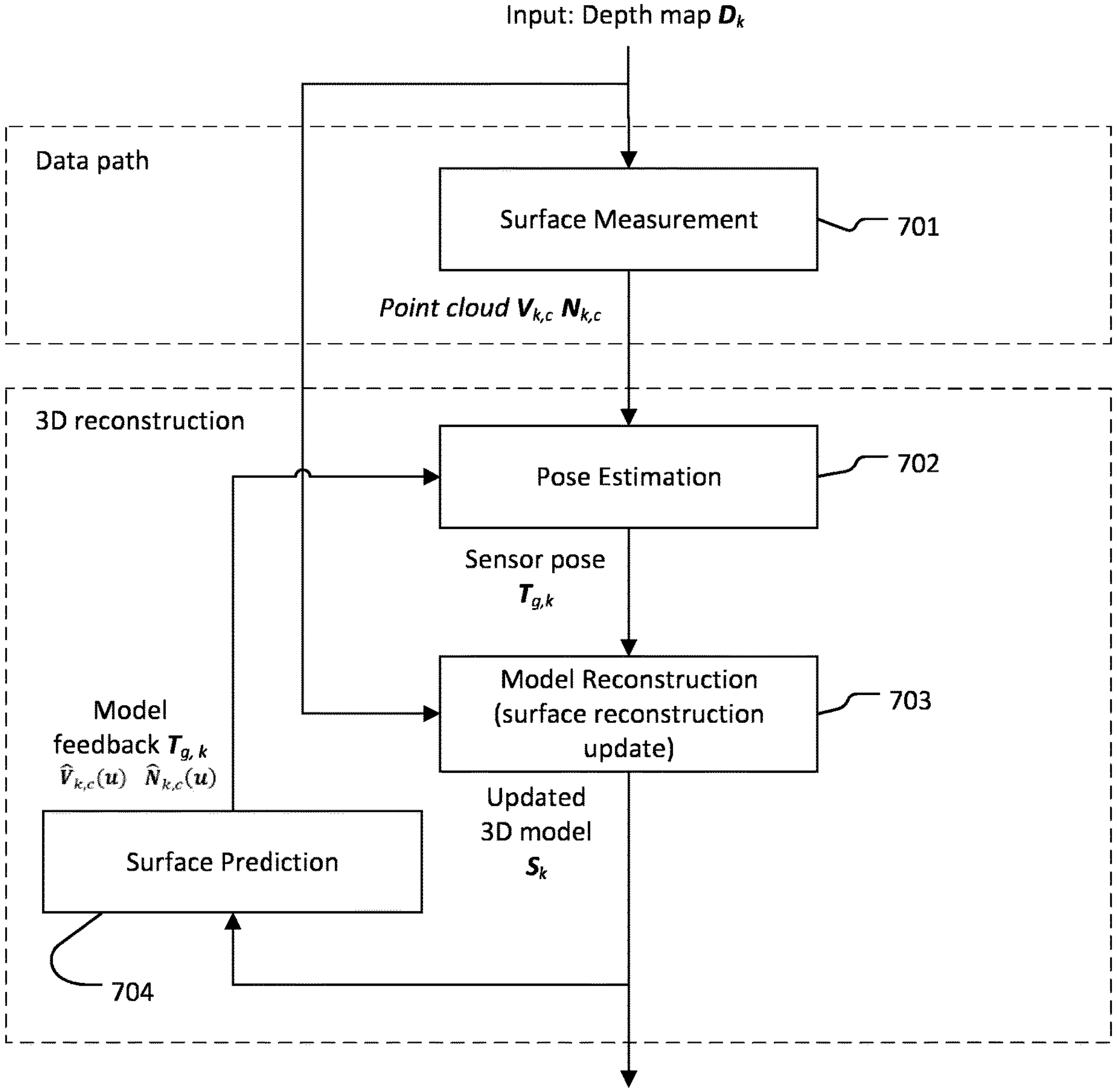
FIG. 7 shows an example of 3D reconstruction in more detail.

FIG. 7 shows an example of 3D reconstruction (104 in FIG. 5) in more detail. The example follows an approach proposed by R. A. Newcombe et. al. in "KinectFusion: Real-time dense surface mapping and tracking", 2011 10th IEEE International Symposium on Mixed and Augmented Reality, 2011, pp. 127-136 (also referred to below as "KinectFusion" approach). KinectFusion describes a technology in which a real-time stream of depth maps is received and a real-time dense SLAM is performed, producing a consistent 3D scene model incrementally while simultaneously tracking the ToF camera's agile motion using all of the depth data in each frame.

A surface measurement 701 of the ToF data path receives a depth map $D_k(u)$ of the scene 101 from the ToF camera for each pixel for the current frame k to obtain a point cloud represented as a vertex map $V_{k,c}$ and normal map $N_{k,c}$. The subscript "c" stands for camera coordinates.

A pose estimation 702 of the 3D reconstruction estimates a pose $T_{g,k}$ of the sensor based on the point cloud $V_{k,c}$, $N_{k,c}$ and model feedback $\hat{V}_{k-1,c}(u)$, $\hat{N}_{k-1,c}(u)$, $T_{g,k-1}$. The subscript "g" stands for global coordinates.

A model reconstruction 703 of the 3D reconstruction performs a surface reconstruction update based on the estimated pose $T_k$ and the depth measurement $D_k(u)$ and provides an updated 3D model $S_k$ of the scene 101.

A surface prediction 704 receives the updated model $S_k$ and determines a dense 3 model surface prediction of the scene 101 viewed from the currently estimated pose $T_{g,k}$, which yields a model estimated vertex map $\hat{V}_{k,c}(u)$ and model estimated normal vector $N_{k,c}(u)$ stated in the ToF camera coordinate system of the current frame k. Surface Measurement The surface measurement 701 of the ToF datapath receives a depth map $D_k(u)$ of the scene 101 from the ToF camera for each pixel for the current frame k to obtain a point cloud represented as a vertex map $V_{k,c}$ and normal map $N_{k,c}$. Each pixel is characterized by its corresponding (2D) image domain coordinates $u=(u_1, u_2)$, wherein the depth measurement $D_k(u)$ for each pixel u for the current frame k combined yields the depth map $D_k$ for the current frame k. This yields a vertex map $V_{k,c}(u)$ for each pixel u (i.e. a metric point measurement in the ToF sensor coordinate system of the current frame k) which is also referred to as the point cloud $V_{k,c}$. To the depth measurement $D_k(u)$ a bilateral filter, or any other noise reduction filter known in the state of the art (anisotropic diffusion, nonlocal means, or the like) may be applied before transformation. Further, the measurement 701 further determines a normal vector $N_{k,c}(u)$ for each pixel u in a ToF camera coordinate system.

Using a camera calibration matrix K—which comprises intrinsic camera configuration parameters—each pixel u in the image domain coordinates with its according depth measurement $D_k(u)$ is transformed into a three dimensional vertex point $V_{k,c}(u)=(x_{k,c}, Y_{k,c}, z_{k,c})^T \in \mathbb{R}^3$ within the ToF camera coordinate system corresponding to the current frame k:

$$V_{k,c}(u) = \begin{pmatrix} x_{k,c} \\ y_{k,c} \\ z_{k,c} \end{pmatrix} = D_k(u) \cdot K^{-1} \cdot \begin{pmatrix} u_1 \\ u_2 \\ 1 \end{pmatrix} \quad \text{(Eq. 22)}$$

This transformation is applied to each pixel u with its according depth measurement $D_k(u)$ for the current frame k which yields a vertex map $V_{k,c}(u)$ for each pixel u (i.e., a metric point measurement in the ToF sensor coordinate system of the current frame k) which is also referred to as the point cloud $V_{k,c}$. Further, the measurement 701 further determines a normal vector $N_{k,c}(u)$ for each pixel u in a ToF camera coordinate system.

Pose Estimation

The pose estimation 702 of the 3D reconstruction receives the vertex map $V_{k,c}(u)$ and the normal vector $N_{k,c}(u)$ for each pixel u in the camera coordinate system corresponding to the current frame k, and a model estimation for the vertex map $\hat{V}_{k-c}(u)$ and a model estimation for the normal vector $\hat{N}_{k,c}(u)$ for each pixel u from surface prediction 704 (see below) based on the latest available model updated of the previous frame k−1. In another embodiment the pose estimation may be based directly on the model $S_k$ from which all points and all normals may be received by resampling. Further, the pose estimation 702 obtains an estimated pose $T_{g,k-1}$ for the last frame k−1 from a storage. In another embodiment more than one past pose may be used. For example, in a SLAM pipeline a separate (or "backend") thread is available that does online bundle adjustment and/or pose graph optimization in order to leverage all past poses. Then the pose estimation estimates a pose $T_{g,k}$ for the current frame k. The pose of the ToF camera describes the position and the orientation of the ToF system, which is described by 6 degrees-of-freedom (6DOF), that is three DOF for the position and three DOF for the orientation. The three positional DOF are forward/back, up/down, left/right and the three orientational DOF are yaw, pitch, and roll. The current pose of the ToF camera at frame k can be represented by a rigid body transformation, which is defined by a pose matrix $T_{g,k}$:

$$T_{g,k} := \begin{bmatrix} R_k & t_k \\ 0^T & 1 \end{bmatrix} \in SE(3) \subset \mathbb{R}^{4\times4} \quad \text{(Eq. 23)}$$

wherein $R_k \in \mathbb{R}^{3\times3}$ is the matrix representing the rotation of the ToF camera and $t_k \in \mathbb{R}^{3\times1}$ the vector representing the translation of the ToF camera from the origin, wherein they are denoted in a global coordinate system. SE(3) denotes the so called special Euclidean group of dimension three. The pose estimation is performed based on the vertex map $V_{k,c}(u)$ and the normal vector $N_{k,c}(u)$ for each pixel u of the current frame k and a model estimation for the vertex map $V_{k-1,c}(u)$ and a model estimation for the normal vector $N_{k,c}(u)$ for each pixel u based on the latest available model updated to the previous frame k−1. In another embodiment the model $S_k$ is used directly, especially if it is a mesh model, for example by resampling the mesh. Still further, it is based on the estimated pose $T_{g,k-1}$ for the last frame k−1. The pose estimation estimates the pose $T_{g,k}$ for the current frame k based on an iterative closest point (ICP) algorithm as it is explained in the above cited "KinectFusion" paper. With the estimated pose $T_{g,k}$ for the current frame k, a vertex map $V_{k,c}(u)$ of the current frame k can be transformed into the global coordinate system which yields the global vertex map $V_{k,g}(u)$:

$$V_{k,g}(u) = R_k \cdot V_{k,c}(u) + t_k \quad \text{(Eq. 24)}$$

When this is performed for all pixels u it yields a registered point cloud $V_{k,g}$. Accordingly the normal vector $N_{k,c}(u)$ for each pixel u of the current frame k can be transformed into the global coordinate system:

$$N_{k,g}(u) = R_k \cdot N_{k,c}(u) \quad \text{(Eq. 25)}$$

Model Reconstruction (Surface Reconstruction Update)

The 3D model of the scene 101 can be reconstructed for example based on volumetric truncated signed distance functions (TSDFs) or other models as described below. The TSDF based volumetric surface representation represents the 3D scene 101 within a volume Vol as a voxel grid in which the TSDF model stores for each voxel p the signed distance to the nearest surface. The volume Vol is represented by a grid of equally sized voxels which are characterized by its center $p \in \mathbb{R}^3$. The voxel p (i.e. its center) is given in global coordinates. The value of the TSDF at a voxel p corresponds to the signed distance to the closest zero crossing (which is the surface interface of the scene 101), taking on positive and increasing values moving from the visible surface of the scene 101 into free space, and negative and decreasing values on the non-visible side of the scene 101, wherein the function is truncated when the distance from the surface surpasses a certain distance. The result of iteratively fusing (averaging) TSDF's of multiple 3D registered point clouds (of multiple frames) of the same scene 101 into a global 3D model yields a global TSDF model $S_k$ which contains a fusion of the frames 1, . . . , k for the scene 101. The global TSDF model $S_k$ is described by two values for each voxel p within the volume Vol, i.e. the actual TSDF function $F_k(p)$ which describes the distance to the nearest surface and an uncertainty weight $W_k(p)$ which assesses the uncertainty of $F_k(p)$, that is $S_k:=[F_k(p), W_k(p)]$. The global TSDF model $S_k$ for the scene 101 is built iteratively and depth map $D_k$ of the scene 101 with the corresponding pose estimation $T_{g,k}$ and the of a current frame k is integrated and fused into the previous global TSDF model $S_{k-1}$ of the scene 101, such that the global TSDF model $S_{k-1}:=[F_{k-1}(p), W_{k-1}$ (p)] is updated—and thereby improved—by the registered point cloud $V_{k,g}$ of the current frame k. Therefore, the model reconstruction receives the depth map $D_k$ of the current frame k and the current estimated pose $T_k$ (which yields the registered point cloud $V_{k,g}$ of the current frame k) and outputs an updated global TSDF model $S_k=[F_k(p), W_k(p)]$. That means the updated global TSDF model $S_k=[F_k(p), W_k(p)]$ is based on the previous global TSDF model $S_{k-1}=[F_{k-1}(p), W_{k-1}(p)]$ and on the current registered point cloud $V_{k,g}$. According to the above cited "KinectFusion" paper this is determined as:

$$f(p, T_{g,k}, D_k) = \Psi\left(\lambda^{-1}\|t_k - p\|_2 - D_k(x)\right), \text{ with:} \quad \text{(Eq. 26)}$$

$$\lambda = \left\|K^{-1}[x, 1]^T\right\|_2 \quad \text{(Eq. 27)}$$

$$x = \left\lfloor \pi\left(KT_k^{-1}p\right)\right\rfloor \quad \text{(Eq. 28)}$$

$$\Psi(\eta) = \begin{cases} \min\left(1, \frac{\eta}{\mu}\operatorname{sgn}(\eta), \right. & \text{if } f\eta \geq -\mu \\ \text{null}, & \text{otherwise} \end{cases} \quad \text{(Eq. 29)}$$

$$F_k(p) = \frac{W_{k-1}(p)F_{k-1}(p) + W_{D_{R,k}}(p)f(p, T_k, D_k)}{W_{k-1}(p) + W_{D_{R,k}}(p)} \quad \text{(Eq. 30)}$$

$$W_k(p) = W_{k-1}(p) + w(p, N_{k,c}) \quad \text{(Eq. 31)}$$

$$w(p, N_{k,c}) \propto \cos(\theta)/D_k(x)$$

wherein the function $y=\pi(z)$ performs perspective projection of $z \in \mathbb{R}^3$ including de-homogenization to obtain $y \in \mathbb{R}^2$ and, where θ is the angle between the associated pixel ray direction and the surface normal measurement $N_{k,c}$. TSDFs are for example also described in more detail in the KinectFusion paper cited above. Still further, the model reconstruction 703 may receive a model feedback (for example a model feedback matrix $A_k$, see below) which indicates for each pixel if it is reliable (overlap pixel in case that overlap is sufficient and in case that overlap is not sufficient), unreliable (non-overlap pixel in case that overlap is sufficient) or new (non-overlap pixel in case that overlap is not sufficient). The depth data of a reliable or new pixel may be used to improve the 3 model as described above (that means the model is created or updated with the corresponding depth measurement), the depth data of an unreliable pixel may be discarded or stored to a dedicated buffer that can be used or not.

Surface Prediction

The surface prediction 704 receives the updated TSDF model $S_k=[F_k(p), W_k(p)]$ and determines a dense 3 model surface prediction of the scene 101 viewed from the currently estimated pose $T_{g,k}$. That is a dense 3 model surface prediction of the scene 101 viewed from the currently estimated pose $T_{g,k}$ can be determined by evaluating the surface encoded in the zero-level-set, that is $F_k \equiv 0$. That means a model estimated vertex map $\hat{V}_{k,c}(u)$ and model estimated normal vector $\hat{N}_{k,c}(u)$ stated in the ToF camera coordinate system of the current frame k are determined.

This evaluation is based on ray casting the TSDF function $F_k(p)$. That means each pixel's u corresponding ray within the global coordinate system, which is given by $T_{g,k}K^{-1}[u, 1]^T$, is "marched" within the volume Vol and stopped when a zero crossing is found indicating the surface interface. That means each pixel's ray $T_{g,k}K^{-1}[U, 1]^T$ (or a value rounded to the nearest voxel p) is inserted into the TSDF value $F_k(p)$ and if a zero-level $F_k(p)=0$ is determined it is stopped and the voxel p is determined as part of the model surface (i.e. of the zero-level-set $F_k \equiv 0$) and thereby the estimated model vertex map $\hat{V}_{k,c}(u)$ is determined. If the ray of the ray casting of a certain pixel u "marches" in a region outside the volume Vol, which means that the model $S_k$ is not defined in this region, the estimated model vertex map $\hat{V}_{k,c}(u)$ at this pixel u is defined for example as $V_{k,c}(u)$=NaN (not a number).

Still further, after a pose estimation in the pose estimation 702 and before the model reconstruction in the model reconstruction 703, ray tracing viewed from the currently estimated pose $T_k$ is determined based on ray casting the previously updated model $S_{k-1}=[F_{k-1}(p), W_{k-1}(p)]$ may be performed as described above, which may yield an estimated model vertex map $\hat{V}_{k,k-1,c}(u)$ map for each pixel u viewed from the currently estimated pose $T_{g,k}$. In this case for $\hat{V}_{k,k-1,c}(u)$ the first subscript "k" refers to the currently estimated pose $T_{g,k}$ with regards to the frame k, and the second subscript "k−1" refers to the previously updated model $S_{k-1}$ with regards to the frame k−1. This may be used in the model overlap decision 105-1 as described below.

3D Model

Figure 8:
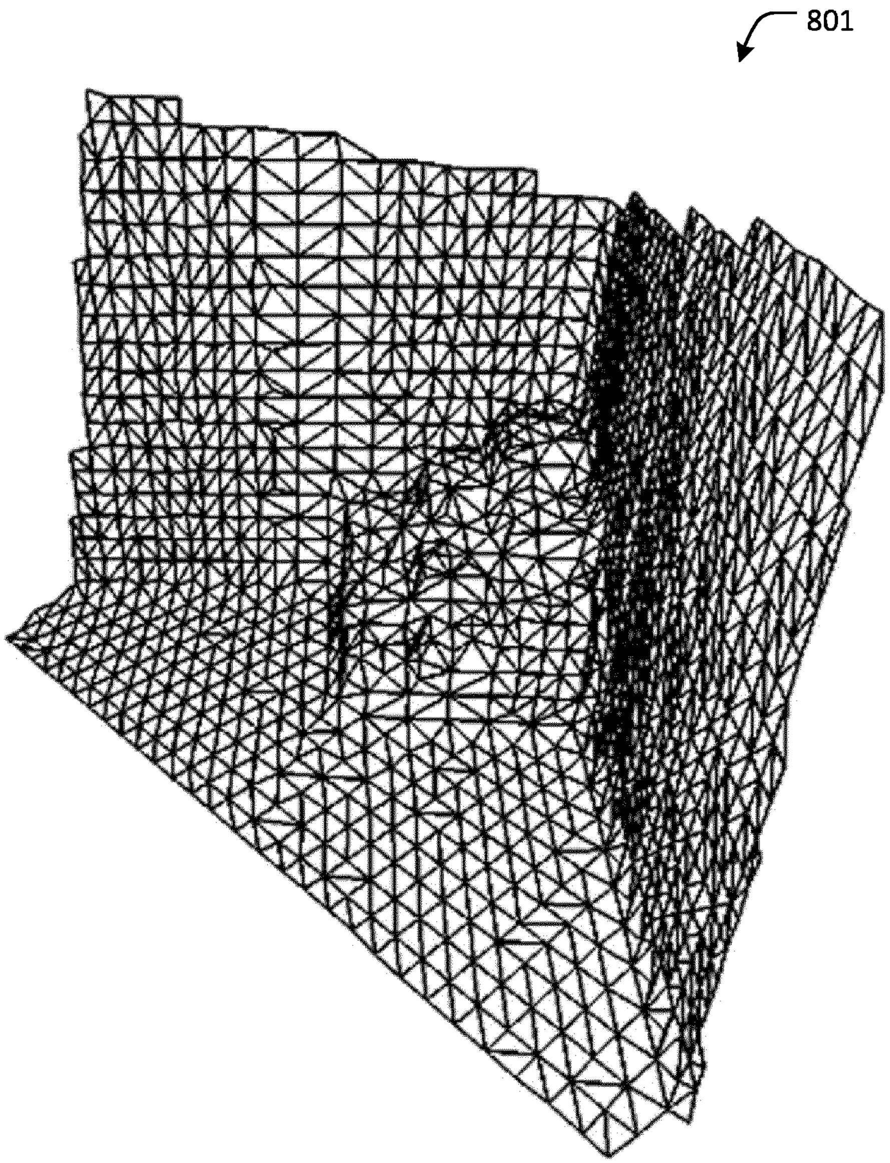
FIG. 8 shows an example of a 3D model of a scene as produced by 3D reconstruction.

FIG. 8 shows an example of a 3D model of a scene as produced by 3D reconstruction. The 3D model is implemented as a triangle mesh grid 801. This triangle mesh may be a local or global three-dimensional triangle mesh. In alternative embodiments a 3D model may also be described by: a local or global voxel representation of a point cloud (uniform or octree); a local or global occupancy grid; a mathematical description of the scene in terms of planes, statistical distributions (e.g., Gaussian mixture models), or similar attributes extracted from the measured point cloud.

In another embodiment a model may be characterized as a mathematical object that fulfills one or more of the following aspects: it is projectable to any arbitrary view, it can be queried for nearest neighbors (closest model points) with respect to any input 3D point, it computes distances with respect to any 3D point cloud, it estimates normals and/or it can be resampled at arbitrary 3D coordinates.

Model Overlap Decision

As shown in the exemplary embodiment of FIG. 5 above, model overlap decision (105-1 in FIG. 5) determines camera feedback information for the adaptive mode generator (105-2 in FIG. 5), model feedback for the 3D model reconstruction (104-2 in FIG. 5) and unwrapping feedback for the ToF datapath (102-2 in FIG. 5) based on the updated 3D model as obtained from 3D reconstruction (104 in FIG. 5), the registered point cloud as obtained from pose estimation (104-1 in FIG. 5) and the depth map as obtained from the iToF camera (102 in FIG. 5).

In another embodiment the 3D model as obtained from 3D reconstruction (104 in FIG. 5) may be not updated. In this case it may only be registered so that the new points in the current view may be mapped to the past model and the update may be finalized afterwards (by discarding for example the most uncertain parts of the update, etc.).

Figure 9:
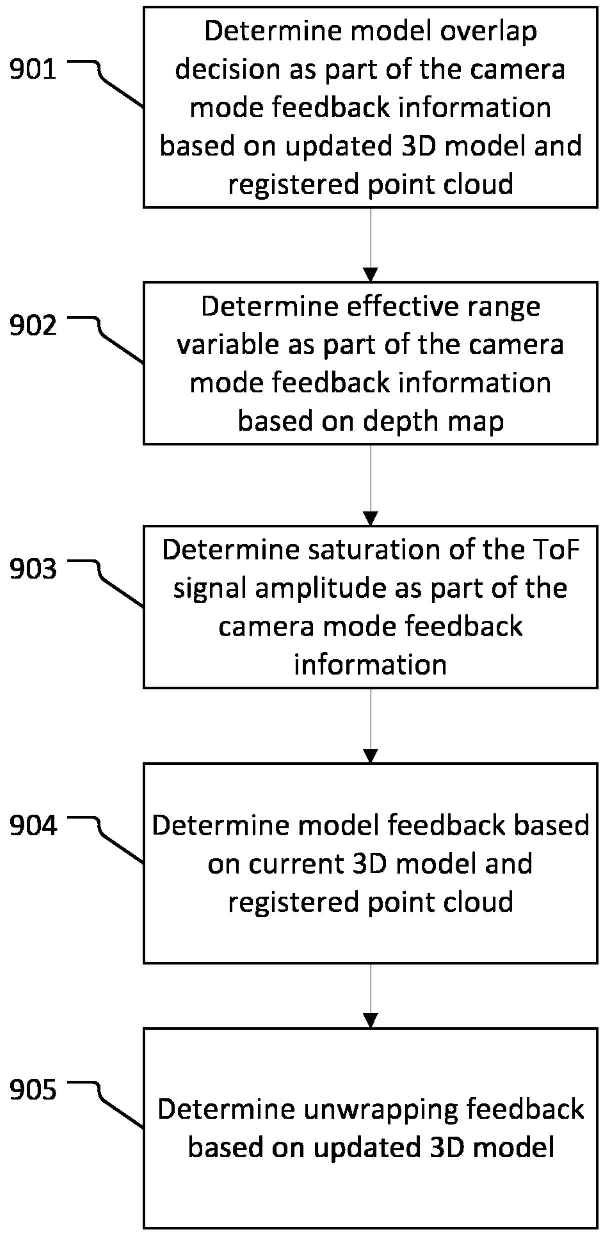
FIG. 9 shows an exemplary process as performed in the model overlap decision.

FIG. 9 shows an exemplary process performed in the model overlap decision. At 901, a model overlap decision is determined as part of the camera mode feedback information based on updated 3D model and registered point cloud. At 902, an effective range variable is determined as part of the camera mode feedback information based on depth map. At 903, a saturation of the ToF signal amplitude is determined as part of the camera mode feedback information. At 904, model feedback is determined based on the current 3D model and registered point cloud. At 905, unwrapping feedback is determined based on an updated 3D model.

It should be noted that the model feedback may be determined based on the registered point cloud (which is based on the received point cloud from the device and the current scene 3D model from the past (obtained from the memory)). The model overlap decision is determined at 901 defines a model overlap between the previous (i.e. k−1) reconstructed 3D model and the current frame k (FoV of the current frame) frame based on the registered point cloud and decides on a camera mode update based on the model overlap. By means of the estimated camera pose, the 3D model can be projected to the desired view, and it can be assessed what fraction of the ToF data of the current frame is overlapping (and therefore improving) the 3D model, and what fraction is new and may be annotated as such in a model feedback. Based on a predetermined criterion, (for example but not limited to a minimum overlapping region) a decision is made whether or not to modify the camera configuration mode.

In another embodiment the 3D model may be projected to the view of the point cloud and the overlap may be computed (photometric error, point-to-mesh distance, depth map distances between depth information from ToF sensor and 3D model projected to depth map (using camera intrinsics)). At this point, it may be decided whether the overlap is sufficient (see FIGS. 10 and 11). Therefore, in order to decide whether the overlap is sufficient or not those points that are overlapping are taken to improve the current 3D model into an updated 3D model, where the new points that come in from the measurements (registered point cloud) refine it. Still further, the new, non-overlapping parts may be used to complete the 3D model with new information (which is also equipped with uncertainty weights) which yields the model feedback (see below). When taking the model feedback into account an updated 3D model is obtained. This updated 3D model may be projected to the depth camera pose and converted into wrapping indexes from the current pose. These wrapping indexes may become the most likely indexes for the next frame (with a smaller prior probability for the neighboring wrapping indexes as well), which yields an unwrapping feedback (see FIG. 13). In addition, based on the model projected to the depth camera pose, and the current depth map, it may be predicted that at the next frame a certain "depth swing" ($D_{max}-D_{min}$) and may be also related quantities such as an "amplitude swing" ($A_{max}-A_{min}$) may occur, so that it may be decided on the integration time and the modulation frequency for the next frame. For example, if the effective range (see FIG. 12) is smaller, the modulation frequency may be increased to reduce noise and if the amplitude is too large, the integration time may be reduced to avoid saturation. These informations are comprised in the camera mode feedback information (see below) which is delivered to the adaptive mode generator (105-2 in FIG. 5, as part of a camera mode sequencer (105 in FIG. 5)) on which basis the adaptive mode generator controls a camera mode update of the iToF camera (see below).

Figure 10:
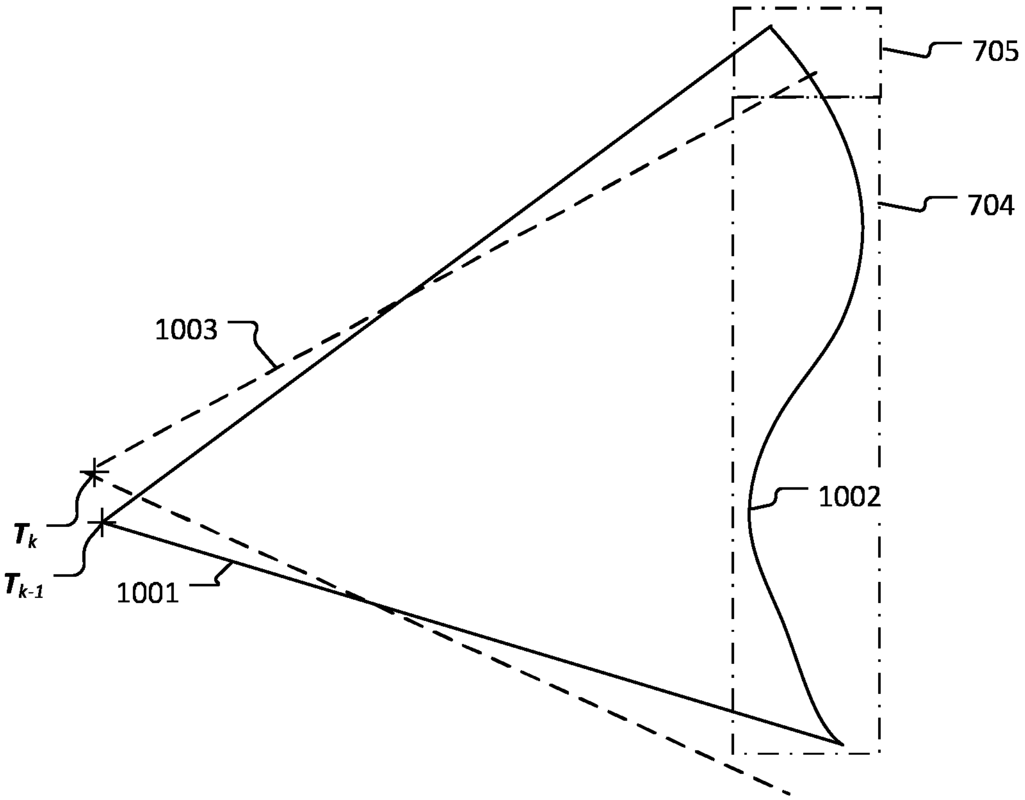
FIG. 10 schematically shows an exemplary overlap between a previous reconstructed 3D model and the field of view of the current frame.

FIG. 10 schematically shows an exemplary overlap between a previous reconstructed 3D model and the field of view of the current frame. The currently available 3D model 1002 (which is schematic 2D projection of the 3D model) is reconstructed viewed from the camera pose $T_{k-1}$ with its corresponding FOV 1001. The current frame k yields an estimated pose $T_k$ and a corresponding FOV 1003. The FOV 1003 and (with its corresponding the estimated pose camera $T_k$) of the current frame k and the reconstructed 3D model 902 overlap within the region 1004 and do not overlap within the region 1005, which may yield an overlap of 95%. A predetermined criterion for minimal overlapping region could be 90% and therefore it is decided that the overlap is sufficient, and the camera configuration mode is modified (see below) and the 3D model can further be updated with the new information about the scene (for example higher SNR depth data) from the current frame k to complete and improve the model.

Figure 11:
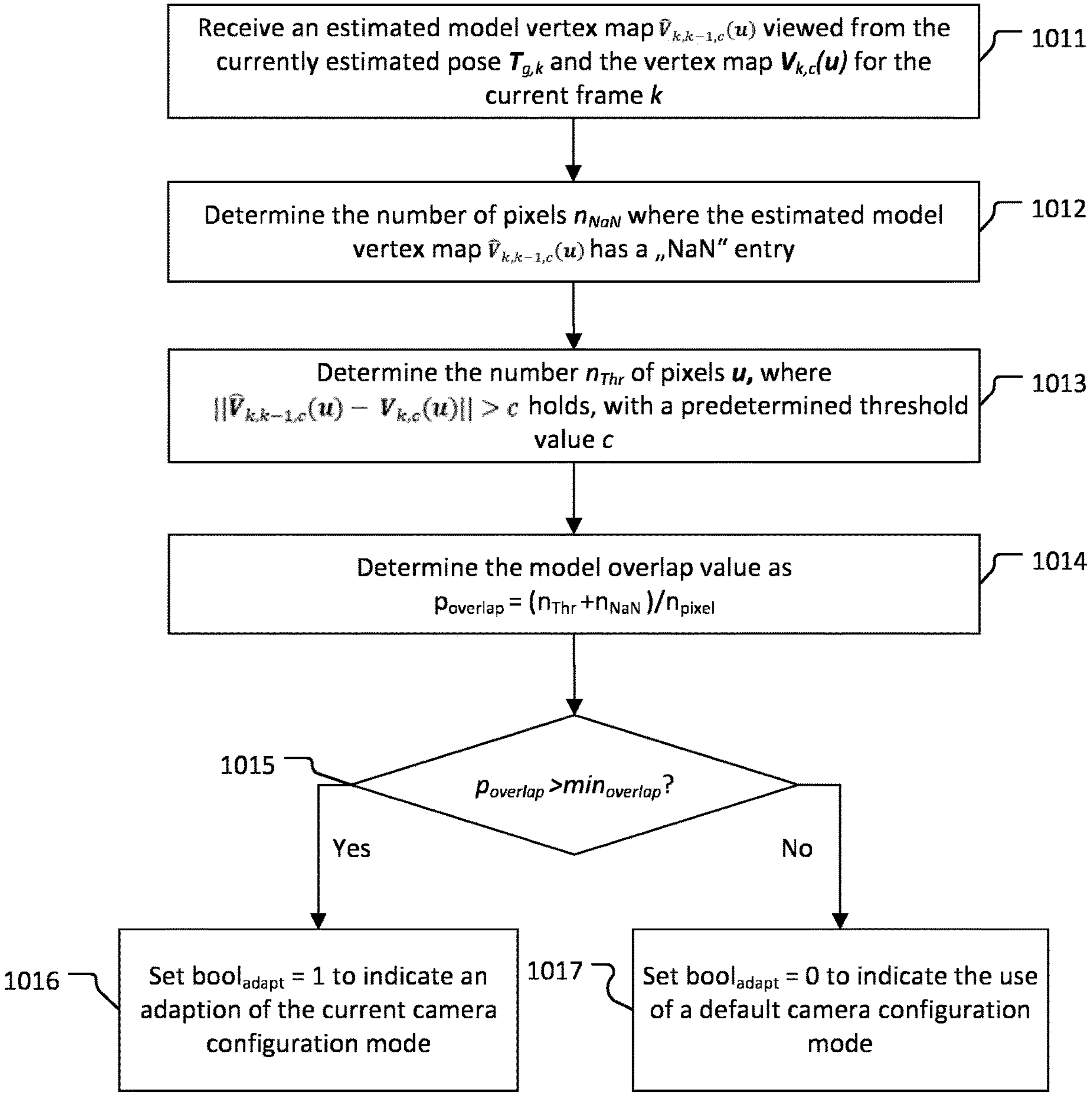
FIG. 11 schematically shows a flowchart of an exemplary model overlap determination procedure carried out by the model overlap decision of the embodiment.

FIG. 11 schematically shows a flowchart of an exemplary model overlap determination procedure carried out by the model overlap decision of the embodiment. At 1011, an estimated model vertex map $\hat{V}_{k,k-1,c}(u)$ viewed from the currently estimated pose $T_k$ (from the surface prediction 704) based on the previously updated model $S_{k-1}=[F_{k\_1}(p), W_{k-1}(p)]$, and the vertex map $V_{k,c}(u)$ of the current frame k is received (it is also possible to receive an estimated model vertex map $\hat{V}_{k-1,c}(u)$ viewed from the previously estimated pose $T_{k-1}$ based on the previously updated model $S_{k-1}=[F_{k-1}(p), W_{k-1}(p)]$). At 1012 the number of pixels $n_{NaN}$ where the estimated model vertex map $\hat{V}_{k,k-1,c}(u)$ has an NaN entry is determined. At 1013, it is determined the number $n_{Thr}$ of pixels u (for each pixel u where the estimated model vertex map $\hat{V}_{k,k-1,c}(u)$ does not have a NaN entry) where the normed difference between the estimated model vertex map $\hat{V}_{k,k\_1,c}(u)$ and the vertex map $V_k(u)$ is greater than a predetermined threshold c, $\|\hat{V}_{k,k\_1,c}(u)-V_{k,c}(u)\|>c$. The norm $\|\cdot\|$ may be a Euclidean ($L_2$) norm, an $L_1$ norm, a maximum ($L_\infty$) norm, or the like. The predetermined threshold c may be for example between 1 cm and 5 cm. At 1014, a model overlap value $p_{overlap}$ between reconstructed 3D model and the current frame k is determined as $$p_{overlap} = \frac{n_{Thr} + n_{NaN}}{n_{pixel}},$$

wherein $n_{pixel}$ is the total number of pixels of the imaging sensor of the iToF camera. At 1015, it is asked if the model overlap value $p_{overlap}$ between reconstructed 3D model and the current frame k is greater than a predetermined minimum overlap value $min_{overlap}$, that is $p_{overlap}>min_{overlap}$. If the answer a 1015 is yes, it is proceeded further with 1016. At 1016, a Boolean variable $bool_{adapt}$ that represents the model overlap decision is set to $bool_{adapt}=1$ to indicate an adaptation of the current camera configuration mode. This may lead to an increased signal-to-noise ratio $SNR_{Signal}$ of the next frame and therefore improve the 3D model or it may improve the depth precision (for example by increasing the modulation frequency). If the answer at 1015 is no, it is proceeded further with 1017. At 1017, the Boolean variable $bool_{adapt}$ that represents the model overlap decision is set to $bool_{adapt}=0$ to indicate the use of a default camera configuration mode.

The model overlap decision passes this model overlap decision $bool_{adapt}$ on to the adaptive mode generator (150-2 in FIG. 5) as part of the camera mode feedback information that controls the adaptive mode generator. If, for example, the predetermined overlap threshold is exceeded, it is decided that the current camera pose benefits from using a different camera configuration mode which is decided by the adaptive mode generation, as described in more detail below.

It should be noted that it may be sufficient to only count the number NaN entries $n_{NaN}$ in the estimated model vertex map $\hat{V}_{k,k-1,c}(u)$ and determine the model overlap value $$p_{overlap} = \frac{n_{NaN}}{n_{pixel}}.$$

This allows to determine if the camera pose has changed significantly (but does not allow to pixel determine if the elements within the scene have moved).

It should further be noted that the model overlap decision described above determines a model overlap between the previous (i.e. k−1) reconstructed 3D model and the current frame k (FoV of the current frame) frame based on the registered point cloud. It should however be noted that in alternative embodiments, the model overlap decision may alternatively determine a model overlap based on the depth map of the scene.

Camera Mode Feedback Information

As shown in the exemplary embodiment of FIG. 5 above, model overlap decision (105-1 in FIG. 5) determines camera mode feedback information for the adaptive mode generator (105-2 in FIG. 5) based on e.g. the updated 3D model as obtained from 3D reconstruction (104 in FIG. 5), the registered point cloud as obtained from pose estimation (104-1 in FIG. 5) and the depth map as obtained from the iToF camera (102 in FIG. 5). This camera mode feedback information is passed to the adaptive mode generator which used this information to determine if the current camera configuration mode is to be adapted/changed as described below in more detail. For example, the camera mode feedback information may comprise the Boolean variable $bool_{adapt}$ that represents the model overlap decision as defined in the example of FIG. 11 above. The camera mode feedback information may further comprise information on which basis the adaptive mode generation (105-2 in FIG. 5) adapts the camera configuration mode. For example, the camera mode feedback information may further comprise an effective range variable $r_{eff}$ which characterizes the effective range of the scene 101 as described below in more detail, and/or the camera mode feedback information may further comprise a saturation value of the ToF signal amplitude (i.e. amplitude of the IQ values/amplitude of the phasor). That means if digital numbers in a certain range (for example 0-1500) are expected and the at a certain number above that range (for example 2000) clipping will start, a flag is received in the depth map indicating that the value is invalid by saturation of the ToF signal. Therefore, the number of saturated pixels may be counted (from the amplitude, or from the depth map) and it may be looked at the amplitude histogram. For example, if 1% of the depth map pixels correspond to amplitude values that have saturated, the integration time must be likely lowered to meet the best sensing conditions.

Effective Range

Figure 12:
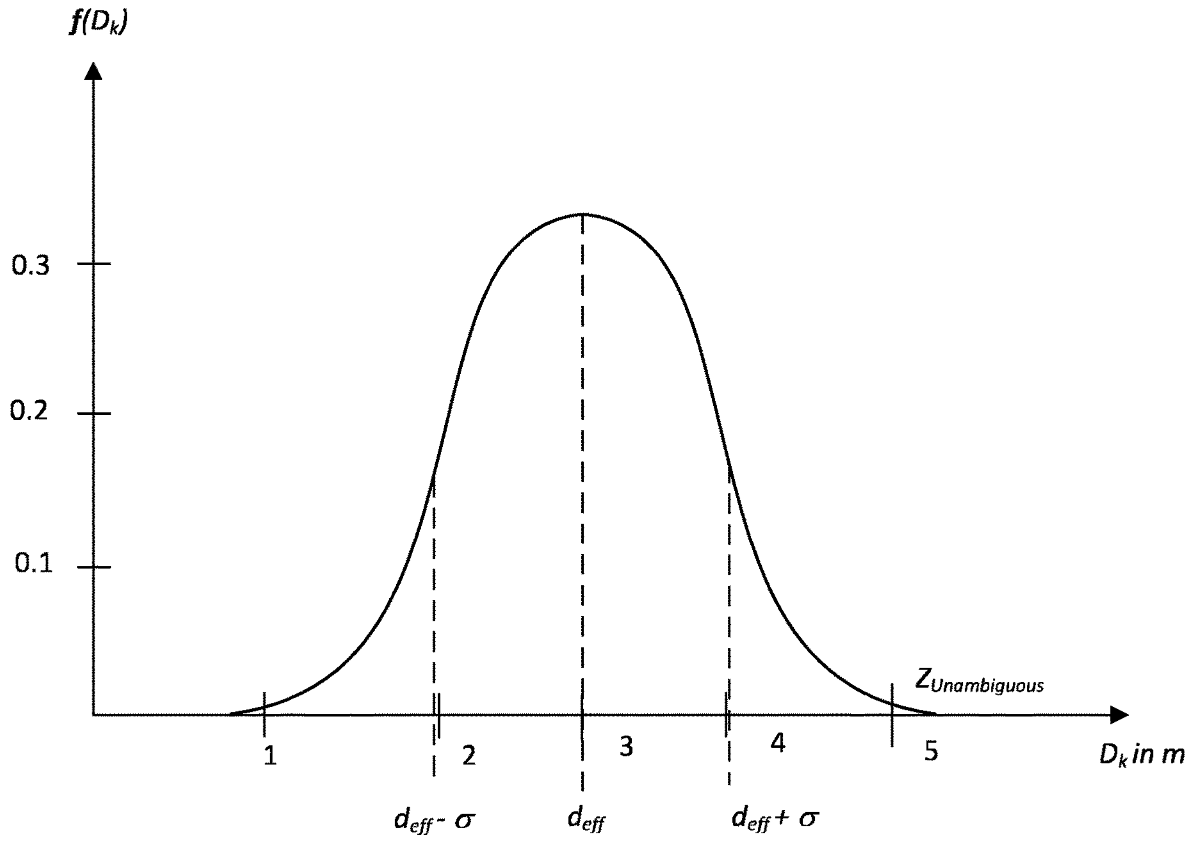
FIG. 12 shows a probability density function of a depth map of a scene with a given exemplary camera mode.

FIG. 12 shows a probability density function of a depth map $D_k$ of a scene with a given exemplary camera mode. Along the x-axis it is plotted the distance of the depth measurement $D_k$ in meters, and along the y-axis the corresponding values of a probability density function $f(D_k)$ (which may be obtained by obtaining an ensemble histogram from the projected 3D model, when projected to a view from the estimated camera pose as a depth map or from computing such a histogram from the last acquired depth map). The graph of the exemplary probability density function $f(D_k)$ has the shape of a Gaussian distribution. The mean-value (expected value) $\mu=d_{eff}$ of the Gaussian distribution of this exemplifying distribution of FIG. 12 is 3 meters ($\mu=d_{eff}=3$ m), and the standard deviation of the probability density function is $\sigma=1.02$ (a relative standard deviation of 34%). That is, one standard deviation above the mean value $\mu$ corresponds to $d_{eff}+\sigma=4.02$ m and one standard deviation above the mean value $\mu$ is $d_{eff}-\sigma=1.98$ m.

In another embodiment the probability density function $f(D_k)$ may have another density function than a Gaussian distribution and it is looked at this density function to decide where to acquire the bulk of depth map information. Further, it may be looked at the amplitude histogram, so that the exposure is so that there is no saturation. For example, if 5% of the current depth map is saturated, the modulation frequency is changed (which does not affect integration time, it can be changed independently) to adapt to, e.g., a reduced unambiguous range (to improve the SNR), where the integration time may have to be reduced also to remove that saturation.

The effective range $r_{eff}$ is defined by the mean value $d_{eff}$ and the standard deviation $\sigma$, that is $r_{eff}=[d_{eff},\sigma]$.

Figure 13:
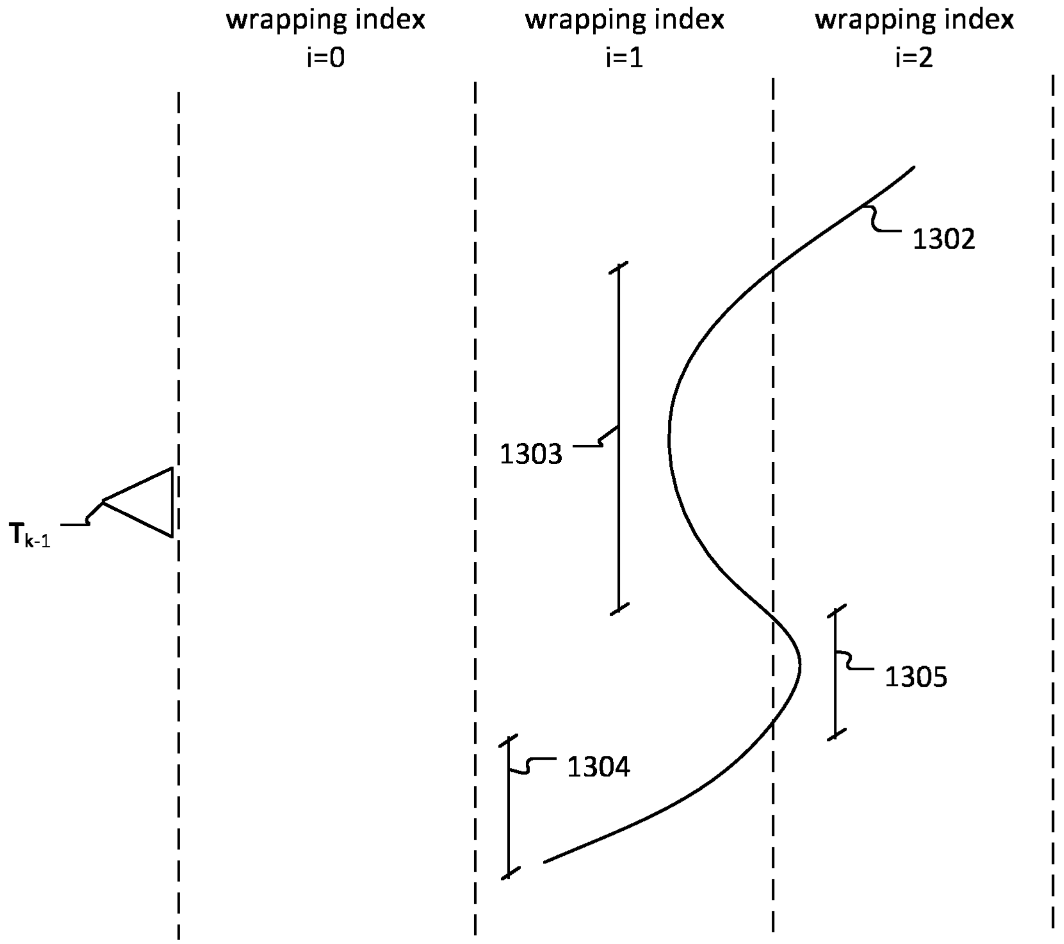
FIG. 13 shows a schematic example of determining a wrapping index probability based on a 3D model maintained by 3D reconstruction of the embodiment described in FIG. 5 and FIG. 7.

In the diagram of FIG. 13 it is also shown an example of the unambiguous range $Z_{Unambiguous}$ (see FIG. 4) of the camera configuration mode, here $Z_{Unambiguous}=5$ m. The unambiguous range $Z_{Unambiguous}$ is above the mean value $\mu$ (that is $\mu=d_{eff}<Z_{Unambiguous}$) and also outside the first standard deviation ($d_{eff}+\sigma<Z_{Unambiguous}$).

This effective range $r_{eff}$ which characterizes the effective range of the scene may for example be determined by the model overlap decision (105-1 in FIG. 5) and may be passed on as part of camera mode feedback information to the adaptive mode generator (105-2 in FIG. 5).

In the example above, the effective range $r_{eff}$ comprises the mean depth of the standard deviation of the depth distribution of the current depth map $D_k$. Alternatively, the effective range $r_{eff}$ may also be defined by the mean depth alone, or by the mean depth weighted by the standard deviation or the like.

Still further, the effective range $r_{eff}$ may comprise the minimum and maximum depth of the current depth map $D_k$, or the 5th and 95th depth percentiles of the current depth map $D_k$, or a full depth histogram.

It should also be noted that in the example given above, the effective range $r_{eff}$ of the scene is defined by the mean depth $d_{eff}$ of the depth map $D_k$. Alternatively, the median depth of the depth map $D_k$ may be used instead of the mean depth.

In another embodiment the effective range $r_{eff}$ may be the interval $[0, D_{upper}]$ where $D_{upper}$ may be the 90th or 95th percentile of the current depth histogram.

Model Feedback

As shown in FIG. 5 above, model overlap decision (105-1 in FIG. 5) may determine, in addition to the camera mode feedback information for the adaptive mode generator (105-2 in FIG. 5), model feedback for the 3D model reconstruction (104-2 in FIG. 5) based on the depth map as obtained from the iToF camera (102 in FIG. 5).

As described above, in order to decide whether the overlap is sufficient or not those points that are overlapping are taken to improve the current 3D model into an updated 3D model, where the new points that come in from the measurements (registered point cloud) refine it. Still further, the new, non-overlapping parts may be used to complete the 3D model with new information (which is also equipped with uncertainty weights) which yields the model feedback.

In another embodiment the model feedback may comprise a model feedback matrix $A_k$ (which may also be implemented as a vector or any other data structure) which has the same size as the depth map $D_k$ and where an entry is set to 0 if the pixel is not known so far in the 3D model (i.e. if the pixel has NaN or $\|\hat{V}^{k,k-1,c}(u)-V_k(u)\|>c$ or $\|\hat{V}_{k-1,c}(u)-V_k(u)\|>C$), that is $a_{ij}=A_k(u)=0$ or set to 1 if the pixel is known in the 3D model, $a_{ij}=A_k(u)=1$. The model feedback matrix $A_k$ may be provided together with the Boolean variable $bool_{adapt}$ as model feedback to the 3D model reconstruction (104-2 in FIG. 5). Thereby, it is provided information on which part of the depth map is not present in the known model (e.g., the depth map covers an unknown area in the scene and should be regarded as new) and which part is overlapping. When the overlap is sufficient (i.e. $bool_{adapt}=1$), the model feedback will annotate the overlapping data as "reliable" ($a_{ij}=A_k(u)=1$) and the non-overlapping data as "unreliable" ($a_{ij}=A_k(u)=0$). The former will contribute to improving the 3D model, the latter will be discarded or stored to a dedicated buffer that can be used or not (e.g., as a higher/lower confidence measure for the reliable/unreliable data) based on the use-case. When the overlap is insufficient (i.e. $bool_{adapt}=0$), the model feedback will annotate the overlapping data as "reliable" ($a_{ij}=A_k(u)=1$) and the non-overlapping data as "new" ($a_{ij}=A_k(u)=0$). Both data will be used to improve the 3D model, with this additional information that can be leveraged or not (e.g., as a higher/lower confidence measure for the reliable/new data) based on the use-case. Thereby, the 3D reconstruction precision is increased mostly when the ToF camera would acquire redundant data, as it is often the case during 3D reconstruction acquisitions.

Unwrapping Feedback

As shown in FIG. 5 above, model overlap decision (105-1 in FIG. 5) may further determine, in addition to the camera mode feedback information for the adaptive mode generator (105-2 in FIG. 5) unwrapping feedback for the ToF datapath (102-2 in FIG. 5) based on the depth map as obtained from the iToF camera (102 in FIG. 5).

When the overlap decision (105-1 in FIG. 5) determines that the overlap between the updated 3D model and the registered point cloud is sufficient, the model overlap decision may deliver such unwrapping feedback to the ToF datapath (102-2 in FIG. 5).

The unwrapping feedback may comprise information for each pixel about the probability for the pixel of being inside a certain wrapping index (or "bin") i, based on the reconstructed 3D model. As described with respect to FIG. 5, when determining the phase $\phi$ of a pixel a wrapping problem may occur for measurements which exceed the unambiguous range $Z_{Unambiguous}$. If a phase measurement beyond the unambiguous range $Z_{Unambiguous}$ are expected, than the wrapping index i of each pixel has to be determined by some "unwrapping" process.

FIG. 13 shows a schematic example of determining a wrapping index probability based on a 3D model maintained by 3D Reconstruction of the embodiment described in FIG. 5 and FIG. 7. A reconstructed 3D model 1302 (here, for sake of visualization, a schematic 2D projection of the 3D model) is viewed from the camera pose $T_{k-1}$ with its corresponding FOV. This reconstructed model 1302 is represented by an estimated model vertex map ($\hat{V}_{k-1,c}(u)$ in the description of FIG. 7 above). Based on the reconstructed model, for each pixel (U in the description of FIG. 7 above) a prior probability is determined for the likelihoods of the wrapping indices, a wrapping index with the highest probability is determined for each part of the model 1302, that is for each pixel.

The parts of the model 1302 indicated by brackets 1303 and 1304 are determined to have a high prior probability, e.g. P(i)=1, for a wrapping index i=1 but a low prior probability, e.g. P(i)=0, for wrapping indexes i≠1. The part of the model 1302 indicated by bracket 1305 is determined to have a high prior probability, e.g. P(i)=1 for a wrapping index i=2 but a low prior probability, e.g. P(i)=0, for wrapping indices i≠2.

Alternatively, the prior probability P may be chosen as a soft distribution. That is, for each pixel the wrapping index obtained by the 3D model reconstruction may be promoted with a high prior probability, but the neighboring wrapping indices may also be weighted with a slightly higher prior probability than the rest of the available wrapping indices.

In another embodiment an estimated model vertex map $\hat{V}_{k,k-1,c}(u)$ viewed from the current estimated pose $T_k$ based on the previously updated model $S_{k-1}=[F_{k-1}(p), W_{k-1}(p)]$) is used to determine an estimated depth data or phase.

From the received estimated model vertex map $\hat{V}_{k-1,c}(u)$ an estimated depth data $\hat{D}_{k-1}(u)$ is determined for each pixel U by using a back-transformation following from Eq. 22:

$$K\hat{V}_{k-1,c}(u) = \hat{D}_{k-1}(u)\begin{pmatrix} u_1 \\ u_2 \\ 1 \end{pmatrix} \quad \text{(Eq. 32)}$$

Based on Eq. 32, a model-estimated phase $$\phi_{model,k} = \frac{4\pi f_{mod}}{c}\hat{D}_{k-1}(u)$$

is determined and for a pixel u a maximum likelihood estimator is determined (it may be assumed relatively smooth motion). This corresponds to finding the wrapping index hypothesis that maximizes the likelihood of observing a certain phase in the model and in the measurements:

$$\underset{i \in Hypotheses}{\operatorname{argmax}}\ P(\phi_{measurement,k}(u), \phi_{model,k}(u) \mid WrappingIndex(u) = i)P(i) \quad \text{(Eq. 33)}$$

That is, a wrapping index i deduced from the modeled phase from the reconstructed 3D model is weighted higher. Further, this approach can be extended to maximizing a posteriori criterion if prior information is available, for example leveraging spatial priors on the neighboring measurements.

Still further, this approach can be applied also to a coarser scene discretization, for example by looking at an occupancy grid of the 3D model rather than the wrapping indexes of the projected depth map.

When the overlap is insufficient to deduce a wrapping index from the model, it may for example be determined that all unwrapping coefficients have equal probability.

Adaptive Mode Generator

As shown in FIG. 5 above, an adaptive mode generator (105-2 in FIG. 5) of a camera mode sequencer (105 in FIG. 5) controls a camera mode update of an iToF camera (102 in FIG. 5) based on camera mode feedback information obtained from a model overlap decision (105-1 in FIG. 5).

Based on the camera mode feedback information determined by the model decision, the adaptive mode generation may for example determine a camera mode update in such a way to receive increase the signal-to-noise ratio $SNR_{Signal}$ of the next frame and therefore improve the reconstruction of the 3D model of the scene.

The adaptive mode generator may for example manage a number of camera modes which each defines a set of configuration parameters for the iToF camera (see FIGS. 6*a, b, c* and corresponding description).

Based on the camera mode feedback information the adaptive mode generator selects a camera configuration mode from the available camera configuration modes. The adaptive mode generator may for example select the camera mode based on the camera mode feedback information in such a way that the signal-to-noise ratio $SNR_{Signal}$ of the next frame to improve the 3D reconstruction model.

Figure 14:
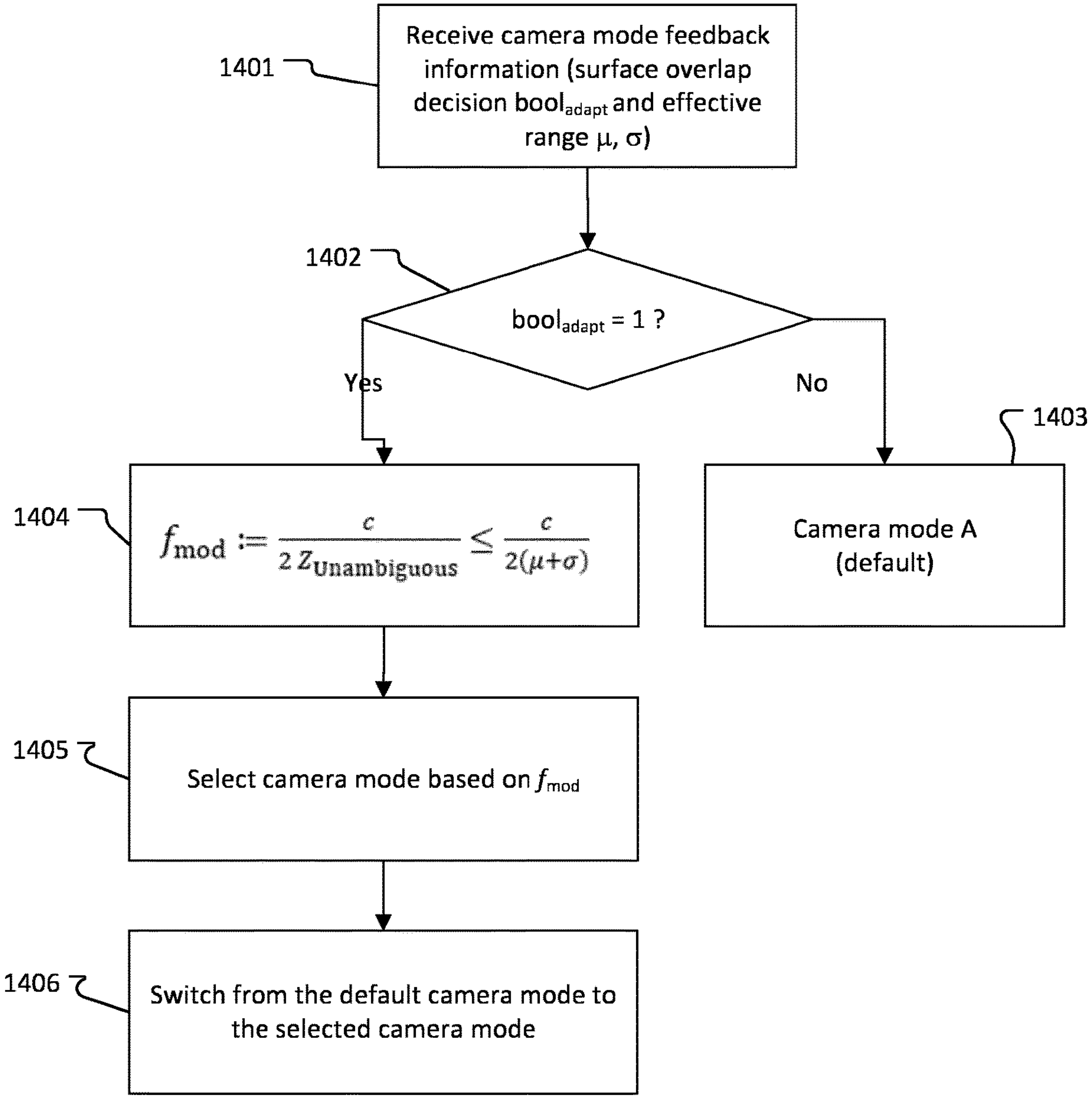
FIG. 14 shows an exemplary process performed in the adaptive mode generator.

FIG. 14 shows an exemplary process performed in the adaptive mode generator.

In the example given in FIG. 14, at 1401, the adaptive mode generator receives as part of the camera mode feedback information an overlap decision parameter (Boolean variable $bool_{adapt}$) which indicates if the camera configuration should be adapted (Boolean variable $bool_{adapt}=1$) or not ($bool_{adapt}=0$). At 1401, the adaptive mode generator also receives as part of the camera mode feedback information further information, here the effective range of the scene $r_{eff}$ defined by mean value $m=d_{eff}$ and standard deviation $\sigma$ of the probability function of the depth map as described in more detail with regard to FIG. 13 above.

At 1402, the adaptive mode generator determines based on overlap decision parameter $bool_{adapt}$ obtained by model overlap decision if there is enough overlap for a camera mode update (901 in FIG. 9). If $bool_{adapt}=0$ (there is insufficient overlap for a camera mode update) the mode generator continues at 1403 and sets the camera configuration mode to (or keeps it at) a default camera configuration mode with sufficiently long unambiguous range and corresponding modulation frequency. In the exemplary default camera mode, the modulation frequency is for set at an exemplary value of $f_{mod}=20$ MHz (see FIG. 6*a* and corresponding description above). According to Eq. 19 the modulation frequency $f_{mod}=20$ MHz of this default mode results in an unambiguous range $Z_{Unambiguous}=7.5$ m.

In a case where the overlap decision detects that there is sufficient overlap between the currently measured point cloud and the previous 3D model (i.e. $bool_{adapt}=1$), the adaptive mode generator decides that it is possible to switch the camera mode to an optimized mode and continues at 1404.

In the example provided here, the adaptive mode generator selects the alternative camera mode on the basis of the effective range $r_{eff}=[d_{eff}, \sigma]$ as obtained from the model overlap decision and described with regard to FIG. 12 above.

At 1404 the frequency modulation $f_{mod}$ is determined based on Eq. 19 above in such a way that unambiguous range $Z_{Unambiguous}$ exceeds the first standard deviation above the mean depth:

$$Z_{Unambiguous} \geq \mu + \sigma \qquad \text{(Eq. 34)}$$

$$f_{mod} := \frac{c}{2\,Z_{Unambiguous}} \leq \frac{c}{2(\mu + \sigma)}$$

Figure 15A:
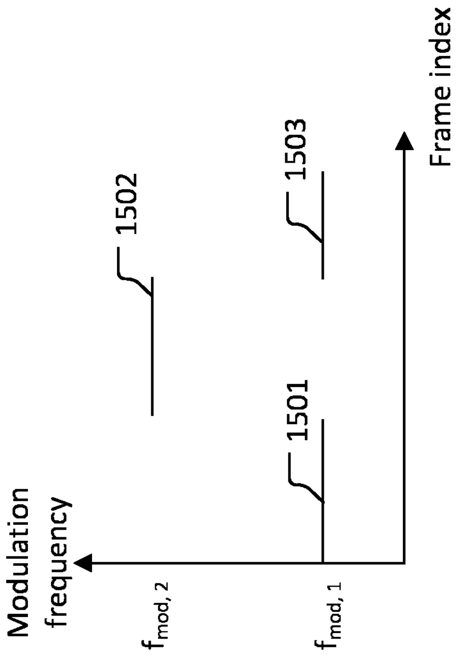
FIG. 15A shows an embodiment of a camera configuration mode adaptation for a dual-frequency iToF camera as described in the example of FIG. 14.

With exemplifying parameters of $\mu=d_{eff}=3$ m, $\sigma=0.61$ m, this yields a modulation frequency $f_{mod}\leq 41.5$ MHz for the mode update (see also FIG. 15A).

Based on this envisaged modulation frequency $f_{mod}=41.5$ MHz, the adaptive mode generator, at 1405, selects a camera mode which fits best to the frequency requirement. At 1406 the adaptive mode generator controls the ToF camera to switch from the default camera mode A to this selected camera mode (mode B).

This increases the signal-to-noise ratio $SNR_{Signal}$ of the next frame as it increases the resolution within the decreased unambiguous range that fits the current scene better than the configuration settings applied in the previous frame in which the unambiguous range of the was longer than needed.

In the example provided above, the adaptive mode generator sets the modulation frequency so that the unambiguous range one standard deviation above the mean depth of the scene. In alternative embodiments, this may be chosen differently. For example, the modulation frequency $f_{mod}$ may be set to correspond to two or three standard deviations above the mean, or to correspond to an unambiguous range defined as a certain percentile of the probability density function of depth of a depth map $D_k$ or the like.

In the example above, the adaptive mode generator responds to camera mode feedback information comprising the effective range of the scene and adapts the camera mode by changing the modulation frequency of a multi-frequency ToF camera. Focusing here on the effective range and modulation frequency, however, serves only as an example. Any single configuration parameters or groups of configuration parameters may be adapted by the adaptive mode generator in a similar way. And the adaptive mode generator might base its decision on any other camera mode feedback information that is suitable to control the camera mode.

It should also be noted that in another embodiment it may not be required that a predefined camera mode comprises multiple configuration parameters as shown in FIGS. 6*a, b, c* above. A camera mode might also be described by a single configuration parameter, like the modulation frequency as such, or the integration time as such. In other words: An alternative to applying predefined camera modes A, B, C with multiple configuration parameters as described in the examples above, the adaptive 2*s* mode generator might as well directly alter a specific configuration setting as such, without reference any reference to mode settings.

FIG. 15A shows an embodiment of a camera configuration mode adaptation for a dual-frequency iToF camera as described in the example of FIG. 14 above. The x-axis shows the frame number and the y-axis shows the modulation frequency $f_{mod}$. During a first frame period 1501 a camera configuration mode with a first modulation frequency $f_{mod,1}$ is used, which is a default camera configuration mode. Then, during a second frame period 1502 the camera configuration mode is changed to a camera configuration mode with a second modulation frequency $f_{mod,2}$ which is higher than the first modulation frequency $f_{mod,1}$ and therefore decreases the unambiguous range and increases the signal-to-noise ratio $SNR_{Signal}$ within the reduced unambiguous range (meaning an increased signal-to-noise ratio $SNR_{Signal}$) more information about a scene is received). Then, during a third frame period 1503 the camera configuration is again changed back to the default camera configuration mode where the first modulation frequency $f_{mod,1}$ is used again.

Figure 15B:
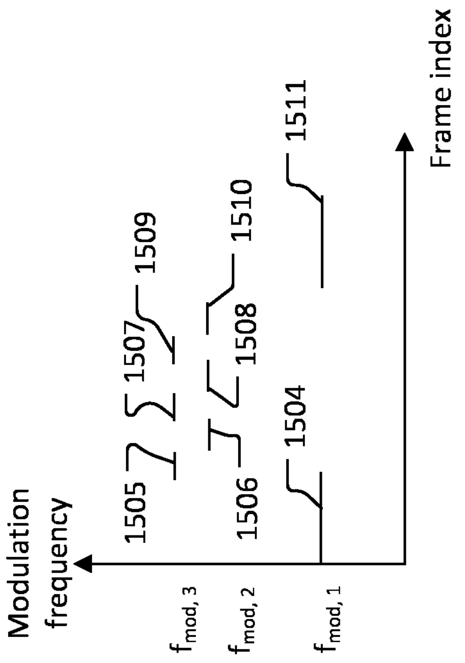
FIG. 15B shows an embodiment of a camera configuration mode adaptation for a multi-frequency iToF camera.

FIG. 15B shows an embodiment of a camera configuration mode adaptation for a multi-frequency iToF camera. The x-axis shows the frame number and the y-axis shows the modulation frequency $f_{mod}$. During a first frame period 1504 a camera configuration mode with a first modulation frequency $f_{mod,1}$ is used, which is a default camera configuration mode. Then, during the frame periods 1505-1510 a second camera configuration is used for the dual-frequency iToF camera which alternates between two different modulation frequencies $f_{mod,2}$ and $f_{mod,3}$. The second modulation frequency $f_{mod,2}$ is used during the frame periods 1505, 1507 and 1509 and the third modulation frequency $f_{mod,3}$ is used during the frame periods 1506, 1508 and 1510. The second and the third modulation frequencies $f_{mod,2}$ and $f_{mod,3}$ are both higher than the first modulation frequency $f_{mod,1}$ and therefore the unambiguous range is decreased and the signal-to-noise ratio $SNR_{Signal}$ within the reduced unambiguous range is increased (meaning an increased signal-to-noise ratio $SNR_{Signal}$). Then, during the frame period 1511 the camera configuration is again changed back to the default camera configuration mode with where the first modulation frequency $f_{mod,1}$ is used again.

Figure 15C:
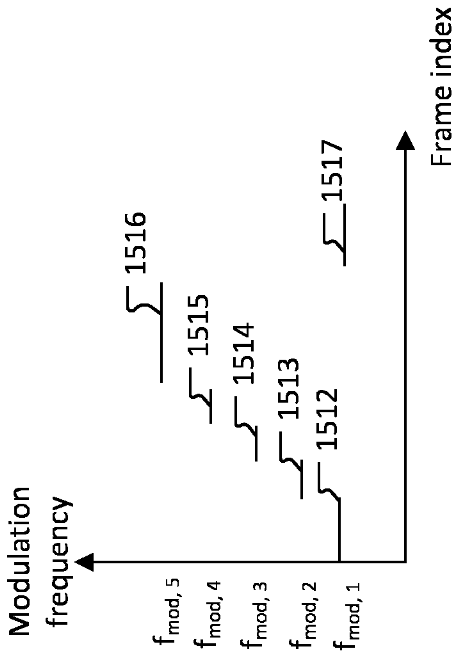
FIG. 15C shows an alternative embodiment of a camera configuration mode adaptation for a multi-frequency iToF camera.

FIG. 15C shows an alternative embodiment of a camera configuration mode adaptation for a multi-frequency iToF camera. The x-axis shows the frame number and the y-axis shows the modulation frequency $f_{mod}$. During a first frame period 1512 a camera configuration mode with a first modulation frequency $f_{mod,1}$ is used, which is a default camera configuration mode. Then, during the frame periods 1513-1516 a second camera configuration is used for the multi-frequency iToF camera which step-by-step increases the different modulation frequencies with $f_{mod,2}<f_{mod,3}<f_{mod,4}<f_{mod,5}$. The modulation frequencies $f_{mod,2}$-$f_{mod,5}$ are all higher than the first modulation frequency $f_{mod,1}$ and therefore the unambiguous range is decreased and the signal-to-noise ratio $SNR_{signal}$ within the reduced unambiguous range is increased (meaning an increased signal-to-noise ratio $SNR_{Signal}$). The multi-frequency approach allows to obtain measurements at several frequencies and therefore for example leads to a multipath mitigation. Then, during the frame period 1517 the camera configuration is again changed back to the default camera configuration mode with where the first modulation frequency $f_{mod,1}$ is used again.

Figure 15D:
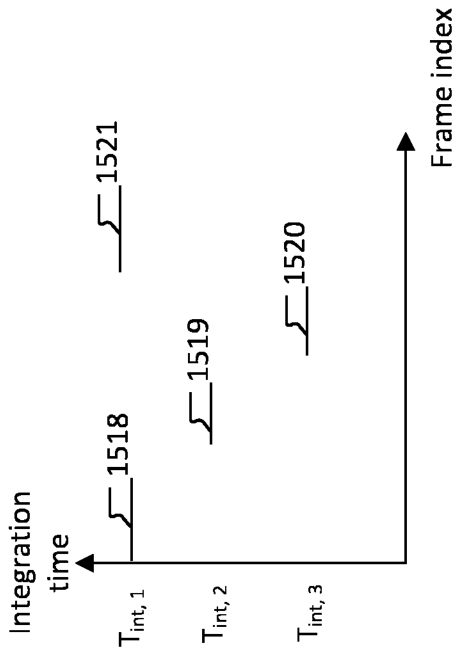
FIG. 15D shows an embodiment of a camera configuration mode adaptation that changes the integration time to receive more information about a scene.

FIG. 15D shows an embodiment of a camera configuration mode adaptation that changes the integration time to receive more information about a scene. The x-axis shows the frame number and the y-axis shows the integration time $T_{int}$. During a first frame period 1518 a camera configuration mode with a first integration time $T_{int,1}$ is used, which is a default camera configuration mode. Then, during a second frame period 1519 a second camera configuration is used with a second integration time $T_{int,2}$ which is shorter than the first integration time $T_{int,1}$. Then, during a third frame period 1520 a third camera configuration is used with a third integration time $T_{int,3}$ which is shorter than the first integration time $T_{int,1}$. With a short integration time (see also FIG. 4) a saturation of a pixel can be avoided. By decreasing the integration time in a plurality of steps objects with different distances can be captured and the quality of the captured data with respect to the 3D model can be maximized (meaning an increased signal-to-noise ratio $SNR_{signal}$). Then during the frame period 1221 the camera configuration is again changed back to the default camera configuration mode with where the first modulation frequency $T_{int,1}$ is used again.

Implementation

Figure 16:
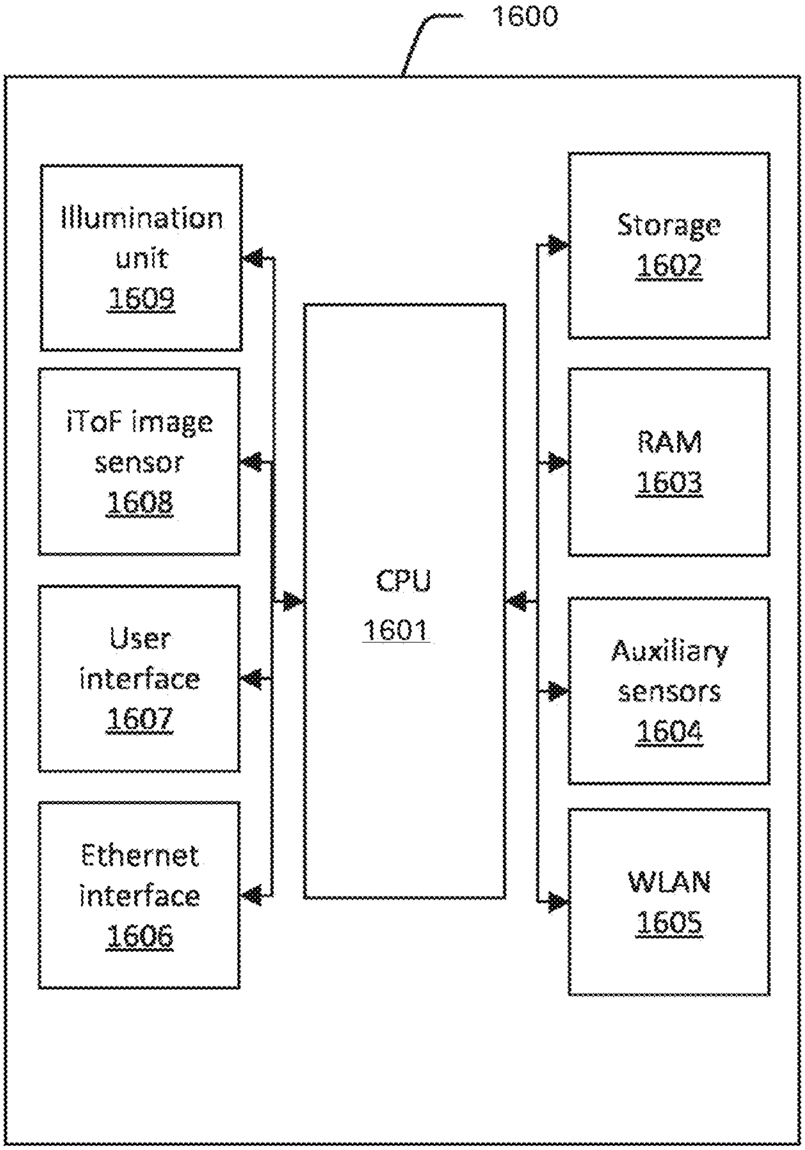
FIG. 16 schematically describes an embodiment of an iToF device that can implement the camera mode sequencer as described in the embodiments above.

FIG. 16 schematically describes an embodiment of an iToF device that can implement the camera mode sequencer as described in the embodiments above, in particular the processes of performing depth measurements, determining a depth map in a datapath, determining 3D model reconstruction, determining a model overlap and generating an adaptive camera configuration mode configuration. The electronic device 1600 may further implement all other processes of a standard iToF system. The electronic device 1600 comprises a CPU 1601 as processor. The electronic device 1600 further comprises an iToF imaging sensor 1608, an illumination unit 1609 and auxiliary sensors 1604 connected to the processor 1601. The processor 1601 may for example implement performing a pose estimation and 3D model reconstruction (see FIG. 7) or overlap decision (see FIGS. 10 and 11). The electronic device 1600 further comprises a user interface 1607 that is connected to the processor 1601. This user interface 1607 acts as a man-machine interface and enables a dialogue between an administrator and the electronic system. For example, an administrator may make configurations to the system using this user interface 1607. The electronic device 1600 further comprises a WLAN interface 1605, and an Ethernet interface 1606. These units 1605, 1606 act as I/O interfaces for data communication with external devices. The electronic device 1600 further comprises a data storage 1602, and a data memory 1603 (here a RAM). The data storage 1602 is arranged as a long-term storage, e.g. for storing camera configuration modes and 3D models or the like. The data memory 1603 is arranged to temporarily store or cache data or computer instructions for processing by the processor 1601.

It should be noted that the description above is only an example configuration. Alternative configurations may be implemented with additional or other sensors, storage devices, interfaces, or the like.

It should be recognized that the embodiments describe methods with an exemplary ordering of method steps. The specific ordering of method steps is, however, given for illustrative purposes only and should not be construed as binding.

It should also be noted that the division of the electronic device of FIGS. 1, 6 and 14 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality 1s provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An electronic device comprising circuitry configured to update a camera configuration ($f_{mod}$, mode A, B, C) based on camera mode feedback information ($bool_{adapt}$, $r_{eff}$) obtained by relating depth information ($V_{k,c}(u)$, $N_{k,c}(u)$, $D_k$) obtained from ToF measurements with a reconstructed model ($S_k$) of a scene (101).

(2) The electronic device of (1), wherein the camera configuration is described by configuration settings of an imaging sensor and/or an illumination unit of an iToF camera.

(3) The electronic device of (1) or (2), wherein the circuitry is configured to reconstruct and/or update the model ($S_k$) of the scene (101) based on the depth information ($V_{k,c}(u)$, $N_{k,c}(u)$, $D_k$) obtained from ToF measurements.

(4) The electronic device of anyone of (1) to (3), wherein the circuitry is configured to determine an overlap ($p_{overlap}$) between the depth information ($V_{k,c}(u)$, $N_{k,c}$ (u), $D_k$) and the model ($S_k$) of the scene, and to update the camera configuration based on the overlap ($p_{overlap}$).

(5) The electronic device of (4), wherein the circuitry is configured to decide, based on the overlap ($p_{overlap}$), whether or not the camera configuration is to be updated.

(6) The electronic device of anyone of (1) to (5), wherein the circuitry is configured to improve a signal-to-noise ratio ($SNR_{Signal}$) by updating the camera configuration.

(7) The electronic device of anyone of (1) to (6), wherein the camera configuration comprises one or more of a modulation frequency ($f_{mod}$) of an illumination unit (210) of a ToF camera, an integration time, a duty cycle, a number samples per correlation waveform period, a number of sub-frames per measurement, a frame rate, a length of a read-out period, a number of sub-integration cycles and a time span of the sub-integration cycles.

(8) The electronic device of anyone of (1) to (7), wherein the camera mode feedback information controlling the camera configuration comprises an effective range ($r_{eff}$) of the scene.

(9) The electronic device of anyone of (1) to (8), wherein the camera mode feedback information controlling the camera configuration comprises a saturation value the ToF signal amplitude.

(10) The electronic device of anyone of (1) to (9), wherein the circuitry is configured to determine unwrapping feedback based on the model ($S_{k-1}$) of the scene.

(11) The electronic device of (10), wherein the circuitry is configured to determine unwrapping feedback for a pixel (u) based on the model ($S_{k-1}$) of the scene (101), and an estimated camera pose ($T_{k-1}$).

(12) The electronic device of (11), wherein the circuitry is configured to determine a wrapping index (i) for a pixel (u) based on the unwrapping feedback for the pixel (u).

(13) The electronic device of anyone of (1) to (12), wherein the circuitry is configured to determine model feedback ($A_k$) based on an overlap ($p_{overlap}$) between the depth information from ToF measurements and the model ($S_k$) of the scene.

(14) The electronic device of anyone of (1) to (13), wherein the circuitry is configured to update parts of the model ($S_{k-1}$) of the scene (101).

(15) The electronic device of anyone of (1) to (14), wherein the circuitry is configured to estimate a camera pose ($T_k$) and to determine an overlap ($p_{overlap}$) between the model ($S_k$) of the scene (101) and a current frame (k) viewed from the estimated pose ($T_k$) of the camera corresponding to the current frame (k).

(16) A method comprising updating a camera configuration ($f_{mod}$, mode A, B, C) based on camera mode feedback information ($bool_{adapt}$, $r_{eff}$) obtained by relating depth information ($V_{k,c}$(u), $N_{k,c}$(u), $D_k$) obtained from ToF measurements with a reconstructed model ($S_k$) of a scene (101).

(17) A computer program comprising instructions which when executed by a processor cause the processor to update a camera configuration ($f_{mod}$, mode A, B, C) based on camera mode feedback information ($bool_{adapt}$, $r_{eff}$) obtained by relating depth information ($V_{k,c}$(u), $N_{k,c}$(u), $D_k$) obtained from ToF measurements with a reconstructed model ($S_k$) of a scene (101).

The invention claimed is:

1. An electronic device comprising circuitry configured to update a camera configuration based on camera mode feedback information obtained by relating depth information obtained from Time of Flight (ToF) measurements with a reconstructed three-dimensional (3D) model of a scene by registering a point cloud obtained from the depth information to a global coordinate system of the reconstructed 3D model.

2. The electronic device of claim 1, wherein the camera configuration is described by configuration settings of an imaging sensor and/or an illumination unit of an iToF camera.

3. The electronic device of claim 1, wherein the circuitry is configured to reconstruct and/or update the reconstructed 3D model of the scene based on the depth information obtained from ToF measurements.

4. The electronic device of claim 1, wherein the circuitry is configured to determine an overlap between the depth information and the reconstructed 3D model of the scene, and to update the camera configuration based on the overlap.

5. The electronic device of claim 4, wherein the circuitry is configured to decide, based on the overlap, whether or not the camera configuration is to be updated.

6. The electronic device of claim 1, wherein the circuitry is configured to improve a signal-to-noise ratio by updating the camera configuration.

7. The electronic device of claim 1, wherein the camera configuration comprises one or more of a modulation frequency of an illumination unit of a ToF camera, an integration time, a duty cycle, a number samples per correlation waveform period, a number of sub-frames per measurement, a frame rate, a length of a read-out period, a number of sub-integration cycles and a time span of the sub-integration cycles.

8. The electronic device of claim 1, wherein the camera mode feedback information controlling the camera configuration comprises an effective range of the scene.

9. The electronic device of claim 1, wherein the camera mode feedback information controlling the camera configuration comprises a saturation value of the ToF signal amplitude.

10. The electronic device of claim 1, wherein the circuitry is configured to determine unwrapping feedback based on the reconstructed 3D model of the scene.

11. The electronic device of claim 10, wherein the circuitry is configured to determine unwrapping feedback for a pixel based on the reconstructed 3D model of the scene, and an estimated camera pose.

12. The electronic device of claim 11, wherein the circuitry is configured to determine a wrapping index for a pixel based on the unwrapping feedback for the pixel.

13. The electronic device of claim 1, wherein the circuitry is configured to determine model feedback based on an overlap between the depth information from ToF measurements and the reconstructed 3D model of the scene.

14. The electronic device of claim 1, wherein the circuitry is configured to update parts of the reconstructed 3D model of the scene.

15. The electronic device of claim 1, wherein the circuitry is configured to estimate a camera pose and to determine an overlap between the reconstructed 3D model of the scene and a current frame viewed from the estimated pose of the camera corresponding to the current frame.

16. The electronic device of claim 1, wherein the reconstructed 3D model is a triangle mesh grid.

17. The electronic device of claim 1, wherein the reconstructed 3D model is a voxel representation of the point cloud.

18. The electronic device of claim 1, wherein the reconstructed 3D model is an occupancy grid.

19. A method comprising updating a camera configuration based on camera mode feedback information obtained by relating depth information obtained from Time of flight (ToF) measurements with a reconstructed three-dimensional (3D) model of a scene by registering a point cloud obtained from the depth information to a global coordinate system of the reconstructed 3D model.

20. A non-transitory computer-readable medium storing a computer program comprising instructions which when executed by a processor cause the processor to update a camera configuration based on camera mode feedback information obtained by relating depth information obtained from Time of Flight (ToF) measurements with a reconstructed three-dimensional (3D) model of a scene by registering a point cloud obtained from the depth information to a global coordinate system of the reconstructed 3D model.

* * * * *